US006082578A

United States Patent [19]

Miyoshi et al.

[11] Patent Number: 6,082,578

[45] Date of Patent: Jul. 4, 2000

[54] VENDING MACHINE FOR PACKAGED COMMODITIES

[75] Inventors: Hiroyuki Miyoshi; Akifumi Miyamoto; Yutaka Sekiguchi; Masahito Kosuge, all of Akashi, Japan

[73] Assignee: Japan Tobacco Inc., Tokyo, Japan

[21] Appl. No.: 08/979,168

[22] Filed: Nov. 26, 1997

[30] Foreign Application Priority Data

| | | | |
|---|---|---|---|
| Nov. 28, 1996 | [JP] | Japan | 8-318164 |
| Mar. 19, 1997 | [JP] | Japan | 9-066878 |

[51] Int. Cl.$^{7}$ .............................. B65G 59/00; B65H 1/00

[52] U.S. Cl. ............................ 221/92; 221/124; 221/131; 221/133

[58] Field of Search .............................. 221/92, 124, 131, 221/133, 268, 197, 198

[56] References Cited

U.S. PATENT DOCUMENTS

| | | | |
|---|---|---|---|
| 2,933,217 | 4/1960 | Salisbury et al. . | |
| 2,952,384 | 9/1960 | Holstein et al. . | |
| 3,160,315 | 12/1964 | Stone et al. . | |
| 3,252,617 | 5/1966 | Ficken . | |
| 3,601,237 | 8/1971 | Ovsienko . | |
| 4,664,289 | 5/1987 | Shimizu et al. | 221/197 X |
| 4,850,511 | 7/1989 | Kral et al. | 221/197 X |
| 5,065,897 | 11/1991 | Smith | 221/133 X |
| 5,830,055 | 11/1998 | Jones et al. | 221/197 X |

FOREIGN PATENT DOCUMENTS

| | | |
|---|---|---|
| 2662002 | 11/1991 | France . |
| 03251995 | 11/1991 | Japan . |
| 07262441 | 10/1995 | Japan . |
| 09027073 | 5/1997 | Japan . |
| 09297885 | 2/1998 | Japan . |
| 173202 | 3/1935 | Switzerland . |

*Primary Examiner*—Christopher P. Ellis
*Assistant Examiner*—Gene O. Crawford
*Attorney, Agent, or Firm*—Birch, Stewart, Kolasch & Birch, LLP

[57] ABSTRACT

Provided is a vending machine of which the depth is shortened by eliminating dead spaces, so that commodities can be dispensed with stability and loaded more easily into commodity columns. In particular, a plurality of commodity storage sections each including a plurality of rows of commodity columns are arranged in stages in a machine body and behind a door. Each commodity storage section is provided with a swingable commodity guide flap that covers its front face. When the door is closed, a commodity chute in which the commodities selectively dispensed from the commodity columns can fall freely is defined between opposite commodity guide flaps in the commodity storage sections on the body side and on the door side. When the door is opened, the commodity chute is removed, and the respective front faces of the storage sections are exposed to provide a working space for commodity loading, for example.

12 Claims, 15 Drawing Sheets

VENDING MACHINE FOR PACKAGED COMMODITIES

BACKGROUND OF THE INVENTION

1. Field of the Invention

The present invention relates to a vending machine for packaged commodities such as packs of cigarettes, and more particularly, to a vending machine with a simple construction in which commodities can be efficiently loaded into commodity columns, and the commodities selectively dispensed from the columns can be guided steadily and securely to a commodity outlet.

1. Description of the Prior Art

In general, a vending machine for packaged commodities, such as packs of cigarettes, comprises a plurality of rows of commodity columns corresponding to various types of commodities. A plurality of commodities are stacked in layers in each commodity column. If one of commodity selector switches is operated, one of the commodities stored in that commodity column which corresponds to the operated switch is selected and dispensed from the column. The commodity dispensed from the commodity column is guided to a commodity outlet, through which it can be taken out.

FIG. 21 shows an outline of a typical conventional vending machine. This machine comprises a plurality of stages of commodity columns 1 that are arranged back to back in two rows. The commodity columns 1 on the back side are designed so as to dispense the commodities on the rear-panel side (back side) of a body 2, and the columns 1 on the front side to dispense the commodities on the side (front side) of a door 4. The commodities dispensed from the back-side columns 1 are guided to a commodity outlet 6 through a commodity chute unit 3 that is defined between the columns 1 and a rear panel of the body 2. The commodities dispensed from the front-side columns 1, on the other hand, are guided to the outlet 6 through a commodity chute unit 5 that is incorporated in the door 4.

FIG. 22 shows an outline of another conventional vending machine. This machine comprises commodity columns 1 of a double-column structure in which commodities stacked in layers are stored in two rows, front and back. The commodities stored in the commodity columns 1 are successively dispensed on the front side. The vending machine having these commodity columns 1 of the double-column structure, compared with the vending machine with the construction shown in FIG. 21, is reduced in depth by a margin for the elimination of the commodity chute unit 3 between the back-side commodity columns 1 and the rear panel of the body 2. In FIG. 22, numeral 7 denotes a commodity dispensing mechanism that underlies each commodity column 1.

In the conventional vending machine with the construction shown in FIG. 21, the commodities cannot be loaded into the back-side commodity columns 1 unless the front-side commodity columns 1 are drawn out forward. Accordingly, the commodity loading efficiency of this machine is not very high. In the vending machine with the construction shown in FIG. 22, on the other hand, the commodities must be loaded into the inner and outer parts of each commodity column 1 at a time. In this machine, therefore, the commodities cannot be efficiently loaded into the inner part of each column 1.

Each commodity column 1 incorporates a depth adjusting member (not shown) for use as a commodity guide mechanism. This adjusting member serves to adjust the posture of the stored commodities to be guided to a commodity dispensing portion that is located in the highest or lowest position in each column 1, thereby securing the delivery of the commodities. The depth adjusting member is regulated for each commodity column 1, depending on the commodity size, and its adjusting portion normally projects in front of each column 1 so as to be situated over a commodity dispensing aperture of the column 1.

The commodity chute unit 5 for guiding the commodities dispensed from the commodity columns 1 to the commodity outlet is located behind the door 4 so as not to interfere with the adjusting portion of the commodity guide mechanism. In order to minimize the depth of the vending machine, the chute unit 5 is designed having the form of a thin commodity chute having a width corresponding to the thickness of each commodity. In order to guide the commodities dispensed from the commodity columns 1 securely into the narrow chute unit 5, commodity posture correcting guides are arranged individually in the respective commodity dispensing apertures of the columns 1 and commodity receiving apertures of the chute unit 5. The posture correcting guides are used as connecting members for connecting the commodity dispensing apertures of the commodity columns 1 and the commodity chute unit 5.

The vending machine constructed in this manner has a wide space that extends between the commodity chute unit 5 and the front side of the commodity columns 1 so as not to interfere with the adjusting portion of the commodity guide mechanism. This space is a dead space that cannot be utilized for any of the functions of the vending machine. Further, the commodity chute unit 5 contains therein various devices for regulating the posture of the falling commodities, thereby preventing jams. Thus, junctions between the commodity columns 1 and the commodity chute unit 5, as well the chute unit 5 itself, are complicated in construction.

SUMMARY OF THE INVENTION

An object of the present invention is to provide a vending machine with a simple construction, in which commodities can be loaded into commodity columns with higher efficiency, and the commodities selectively dispensed from the commodity columns can be securely transferred to a commodity outlet with stability.

Another object of the invention is to provide a vending machine with a simple construction, of which the depth is shortened by eliminating dead spaces in its body.

Still another object of the invention is to provide a vending machine with a simple construction, which is not provided with any thin commodity chute units having a complicated structure, and naturally, requires no connection between commodity chute units and commodity columns.

According to an aspect of the invention, a vending machine for packaged commodities comprises a plurality of commodity storage sections arranged in stages in its body, and each commodity storage section includes a plurality of rows of commodity columns. Each commodity column contains a plurality of the commodities stacked in layers, and successively dispenses the stacked commodities, the upper- or lowermost one first. Each commodity storage section is provided with a commodity guide flap swingably attached to the front face of each corresponding commodity column so as to cover it. The guide flap serves to guide the commodities in the commodity column to a commodity dispensing portion of the column. When a door attached to the front face of the machine body is closed, a commodity chute for guiding the selectively dispensed commodities is defined between the guide flaps and the inside of the door. When the door is opened, a space that constitutes the commodity chute is exposed, so that the chute disappears.

According to another aspect of the invention, a vending machine for packaged commodities comprises a plurality of commodity storage sections arranged in stages in its body and behind its door. When the door is closed, the storage sections face one another across a given space. Each commodity storage section includes a plurality of rows of commodity columns each containing a plurality of the commodities stacked in layers and adapted to be successively dispensed, the upper- or lowermost one first. Each commodity storage section is provided with a commodity guide flap swingably attached to the front face of each corresponding commodity column so as to cover it. The guide flap serves to guide the commodities in the commodity column to a commodity dispensing portion of the column. When the door is closed, a commodity chute for guiding the selectively dispensed commodities is defined between the opposite commodity storage sections in the body and behind the door. When the door is opened, a space that constitutes the commodity chute is exposed, so that the chute disappears.

Thus, the vending machine according to the invention is not provided with any thin commodity chute units for guiding the commodities dispensed from the commodity columns to a commodity outlet. When the door of the vending machine is closed, the space portion defined between the commodity guide flaps attached individually to the commodity storage sections on the body side and the inside of the door or between the commodity guide flaps attached to the commodity storage sections in the body and behind the door serves as a commodity chute. The commodities selectively dispensed from the commodity columns are guided to the commodity outlet as they fall down in the commodity chute.

According to the present invention, therefore, it is unnecessary to provide any commodity chute units (commodity chutes) for guiding the commodities to the commodity outlet, that is, there are no commodity chute units, so that the posture of the commodities dispensed from the commodity columns need not be accurately regulated. Accordingly, there is no need of any guide member or the like that projects in front of the commodity columns. Since the vending machine according to the invention positively utilizes the space in front of the commodity columns as the commodity chute, moreover, there are no such dead spaces that exist in conventional vending machines. In consequence, the depth or thickness of the vending machine according to the present invention can be reduced by a margin corresponding to the eliminated dead spaces. Besides, the vending machine can be simplified in construction and reduced in cost.

According to a preferred aspect of the invention, the commodity guide flaps attached individually to the commodity storage sections in the body are situated on one plane, thereby forming a commodity guide wall surface. Likewise, the commodity guide flaps attached individually to the commodity storage sections behind the door are situated on one plane, thereby forming a commodity guide wall surface. The width of the commodity chute is defined as the width of a space between the commodity guide wall surface defined by the guide flaps and the inside of the door or between commodity guide wall surfaces defined by the guide flaps in the body and behind the door. The width of the commodity chute is a little greater than the maximum diagonal length of each commodity. As a result, the commodities dispensed from the commodity columns can freely fall down with any posture in the commodity chute.

According to another preferred aspect of the invention, moreover, the respective heights of the commodity storage sections arranged in stages in the body are different from those of the ones in the door. Accordingly, the commodities selectively dispensed from the commodity columns on the body or door side are guided in falling down in the commodity chute by the commodity guide flaps of the commodity storage sections on the other side without running against commodity dispensing portions of the other-side storage sections.

According to still another preferred aspect of the invention, each commodity guide flap is formed of a transparent plate or a plate having a through hole. Accordingly, the commodities in the commodity columns can be easily checked for the state of storage through the guide flap without opening the flap.

According to a further preferred aspect of the invention, each of the commodity columns that constitute each commodity storage section is provided with a commodity guide flap capable of rocking sideways and an elastic member for urging the commodity guide flap to rock, thereby situating the guide flap in front of the commodity column. The commodity guide flaps form a wall surface of a commodity chute for guiding the commodities selectively dispensed from each commodity column to the commodity outlet.

According to another preferred aspect of the invention, each commodity guide flap attached to the front face of each corresponding commodity column is formed of a flap member narrower than each commodity column, and is situated in front of the commodity column in a manner such that a given gap is defined between a rocking end of the guide flap and the front end of a side wall surface of the commodity column. The rear face of each commodity guide flap is provided with a guide portion for regulating the position of the front end portion of each commodity in the commodity column, the guide portion being situated in the inner part of the commodity column with respect to the rocking end of the guide flap. The front face of each commodity guide flap is situated on one plane between the commodity columns of the commodity storage sections arranged in stages, thereby forming a guide wall of the commodity chute.

Thus, according to the present invention, there may be provided a vending machine with a very simple construction such that the commodity guide flaps attached individually to the commodity storage sections that are arranged in stages form the guide wall of the commodity chute, whereby the commodities dispensed from the commodity columns are allowed to fall down with a free posture. Since the commodity chute can be exposed to serve as a working space for commodity loading by opening the door, moreover, the efficiency of commodity loading operation of the vending machine can be improved.

DETAILED DESCRIPTION OF THE INVENTION

The following is a description of preferred embodiments of a vending machine according to the present invention.

Figure 1:
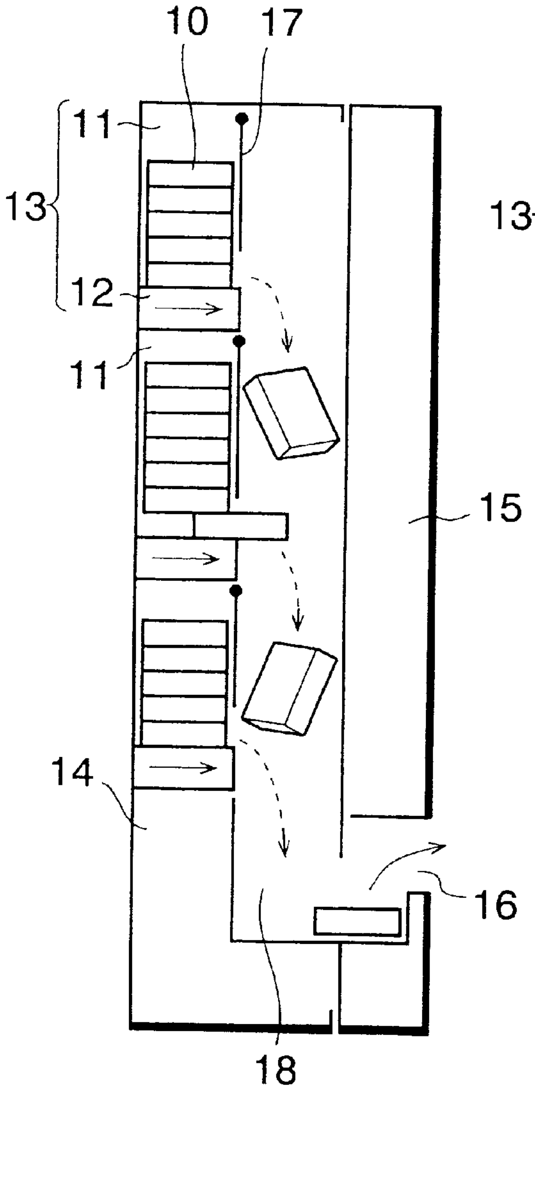
FIG. 1 is a view showing the relation between commodity storage sections and a commodity chute of a vending machine according to a first embodiment of the present invention.

As is schematically shown in FIG. 1, a vending machine according to a first embodiment comprises a plurality of commodity storage sections 13 that are arranged in stages in a body 14 in the form of an open-front box. The commodity storage section 13 in each stage is provided with a plurality of commodity columns 11. Each commodity column 11 contains therein a plurality of packaged commodities 10, such as packs of cigarettes, that are stacked in layers. A commodity dispensing mechanism 12 is provided in the lower portion of each column 11. Each dispensing mechanism 12 successively dispenses the stacked commodities 10 in its corresponding column 11 to the front of the column 11, starting with the lowermost commodity.

Each commodity storage section 13 is provided with a swingable commodity guide flap 17 that collectively covers the front side of the commodity columns 11 included therein. The guide flap 17 is situated on the front face of its corresponding storage section 13, and serves to guide the commodities 10 in each column 11 to its corresponding commodity dispensing portion (top surface of the commodity dispensing mechanism 12). Further, each commodity guide flap 17 on the front face of each commodity storage section 13 forms a smooth flat surface, and functions as a guide wall for a commodity chute, which will be mentioned later.

In loading the commodities 10 into each commodity commodity column 11, the commodity guide flap 17 is opened to expose the front of the column 11. The guide flap 17, which is formed of, for example, a transparent flat plate, allows the commodities 10 in the commodity column 11 to be checked for the state of storage without being opened. Alternatively, the flap 17 may be formed of a plate having a slit or punched hole through which the storage state of the commodities 10 in the column 11 behind the flap can be observed.

When a door 15 is closed, the commodity guide flaps 17 attached individually to the commodity storage sections 13 face the inside of the door 15 across a given space in parallel relation, as shown in FIG. 1. The space defined between the guide flaps 17 and the door 15 has a width a little greater than the maximum diagonal length of each commodity 10, for example, and is used as a free-fall chute (commodity chute) 18 for the commodities 10 that are selectively dispensed from the commodity columns 11.

A display section (not shown) for trade samples is provided on the front side of the door 15, and a plurality of commodity selector switches (not shown) for selectively specifying the commodities 10 are arranged corresponding the trade samples. Also, a commodity outlet 16 is provided in the lower portion of the door 15.

Figure 2:
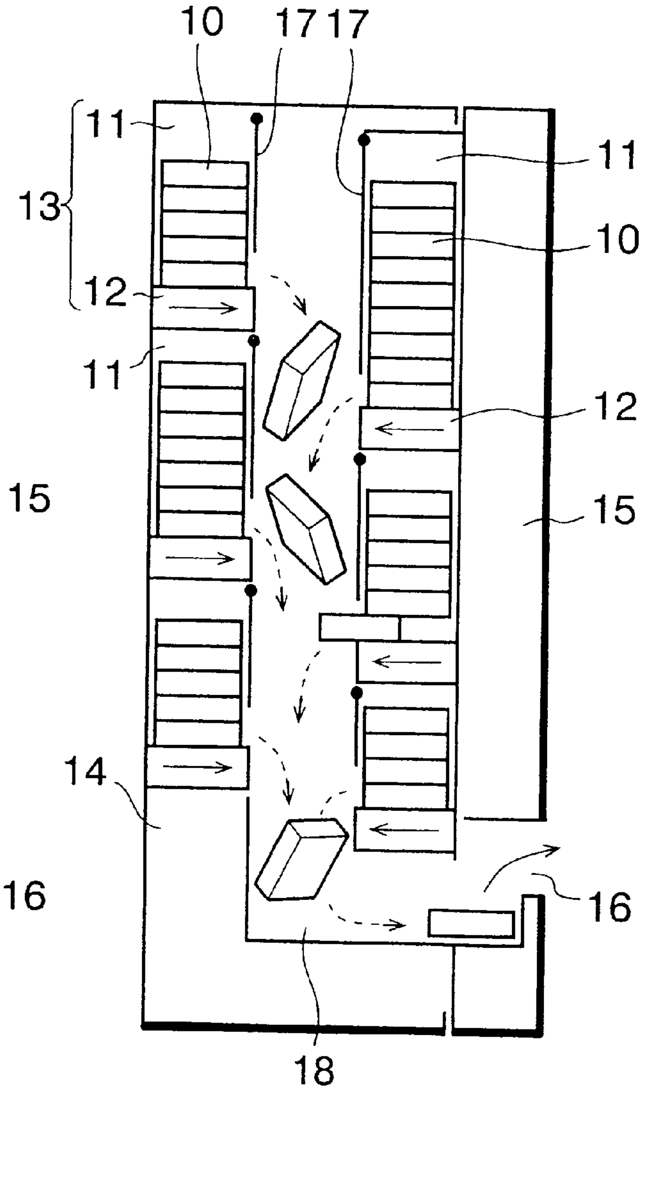
FIG. 2 is a view showing the relation between commodity storage sections and a commodity chute of a vending machine according to a second embodiment of the invention.

FIG. 2 shows an outline of a vending machine according to a second embodiment of the invention. This vending machine comprises a plurality of commodity storage sections 13 arranged in stages at the back of a door 15, as well as a plurality of commodity storage sections 13 that are arranged in stages in a body 14. Each commodity storage section 13, like the one according to the foregoing embodiment, is provided with a commodity guide flap 17 in front that covers the front of commodity columns 11. When the door 15 is closed, as shown in FIG. 2, the commodity storage sections 13 in the body 14 and those on the side of the door 15 face one another across a given space in parallel relation. This space is also used as a free-fall chute (commodity chute) 18 for commodities 10 that are selectively dispensed from the commodity columns 11.

Thus, the vending machines according to the first and second embodiments are not provided with any commodity chute units for guiding the commodities 10 dispensed from the commodity columns 11 to the commodity outlet 16. That space which is defined between the commodity storage sections 13 in the body 14 and the inside of the door 15 when the door 15 is closed, as shown in FIG. 1, functions directly as the free-fall chute 18 for the commodities 10. In this state, the commodity guide flaps 17 attached individually to the commodity storage sections 13 and the inside of the door 15 serve as facing guide walls of the chute 18. Also, that space which is defined between the commodity storage sections 13 in the body 14 and those on the side of the door 15 when the door 15 is closed, as shown in FIG. 2, functions as the free-fall chute 18 for the commodities 10. In this case, the commodity guide flaps 17, which are attached individually to the storage sections 17 in the body 14 and those on the side of the door 15 and face one another in parallel relation, serve as guide walls of the free-fall chute 18.

When the door 15 is opened, on the other hand, the front side of the commodity storage sections 13 or the commodity columns 11, which is composed mainly of the commodity guide flaps 17, is exposed. As a result, in the vending machine with the construction shown in FIG. 1, the free-fall chute 18, which is formed of the space portion defined between the commodity storage sections 13 in the body 14 and the inside of the door 15, ceases to exist. Further, the space in front of the storage sections 13 serves as a working space through which the commodities 10 are loaded into the commodity columns 11. Likewise, in the vending machine with the construction shown in FIG. 2, the free-fall chute 18, which is formed of the space portion defined between the commodity storage sections 13 in the body 14 and those on the side of the door 15, ceases to exist when the door 15 is opened. Also in this case, the space in front of the storage sections 13 serves as a working space through which the commodities 10 are loaded into the commodity columns 11. Thus, the free-fall chute 18 is formed only when the vending machine is activated with the door 15 closed, and the commodities 10 dispensed from the commodity columns 11 can fall down in the chute 18 to the commodity outlet 16 without regard to their posture at the time of delivery.

The following is a detailed description of the vending machine that is basically constructed in the aforementioned manner.

Figure 3:
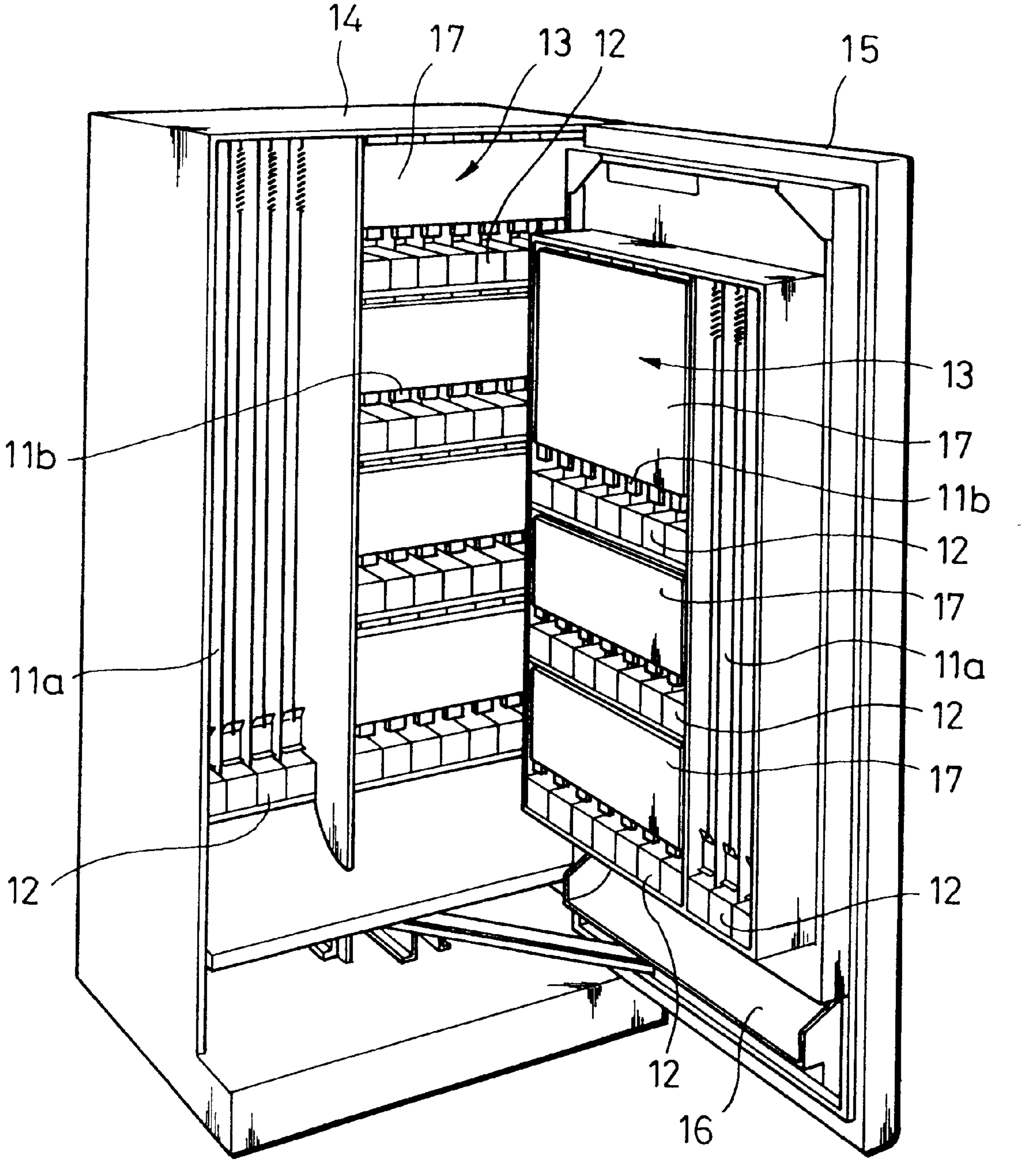
FIG. 3 is a view showing an outline of the vending machine according to the second embodiment with its door section open and the state of the commodity storage sections in a machine body and behind the door section.
Figure 4:
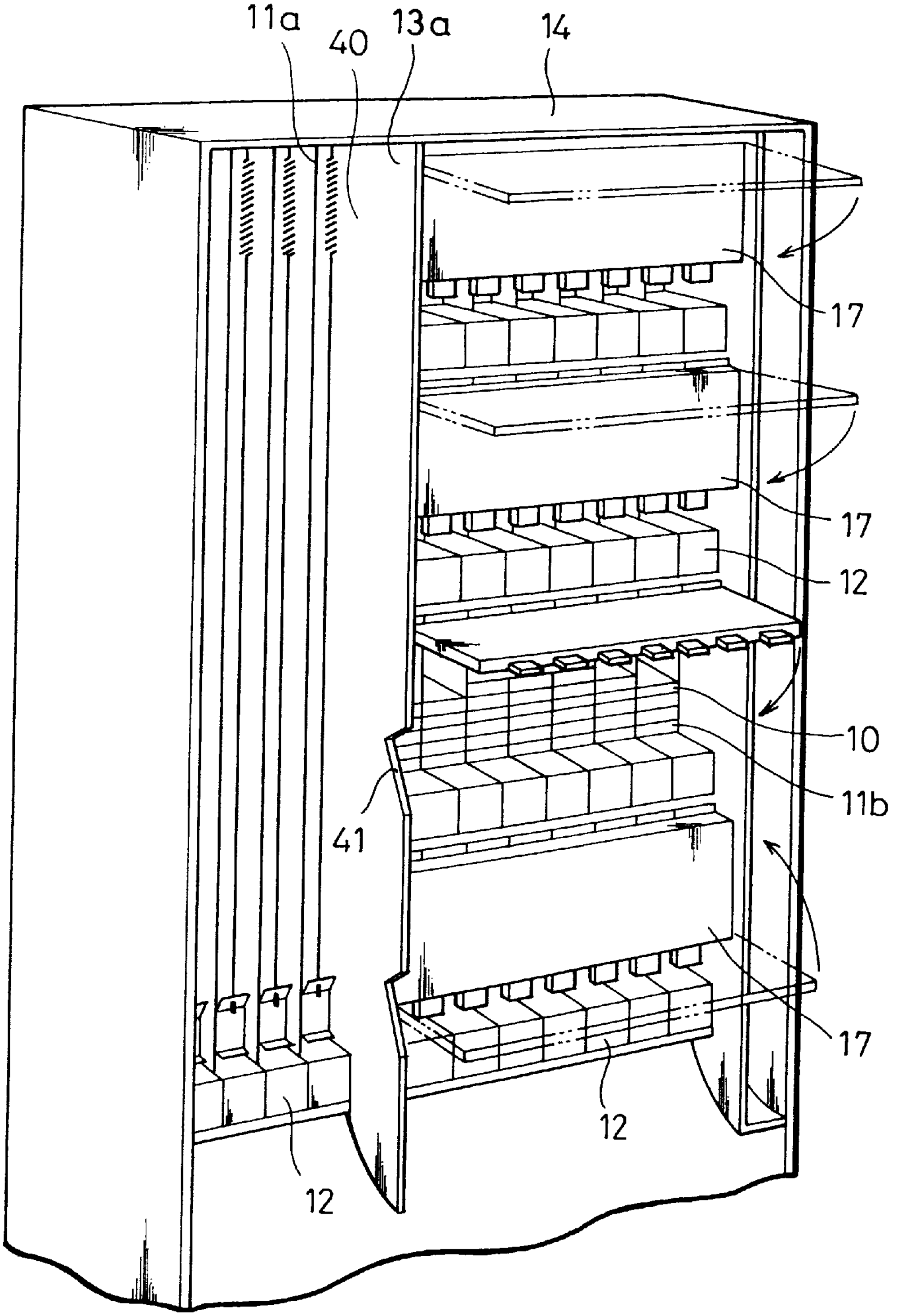
FIG. 4 is a view showing the state of the commodity storage sections in the body and commodity guide flaps arranged in front of commodity columns in the vending machine shown in FIG. 3.
Figure 5:
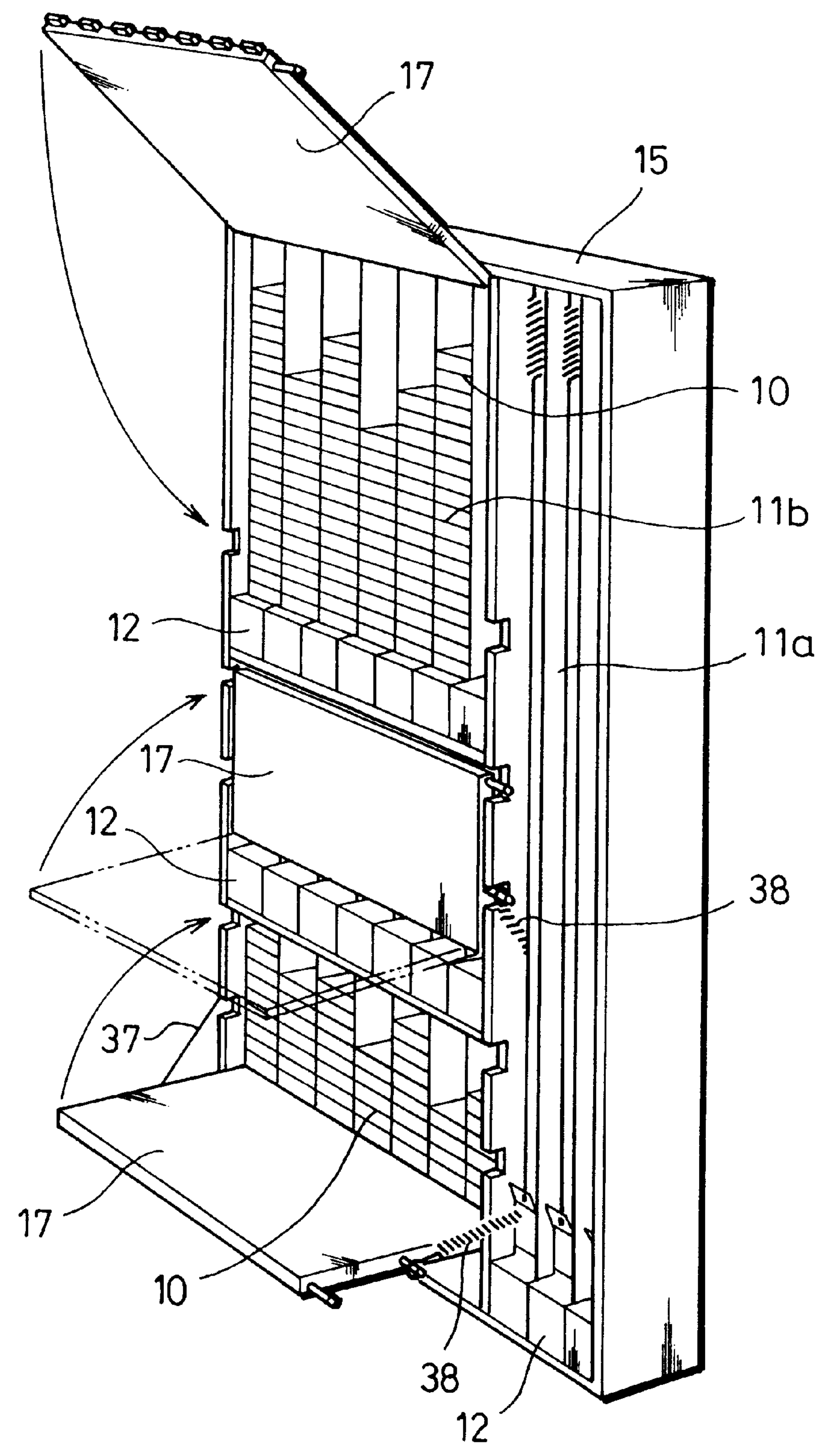
FIG. 5 is a view showing the state of the commodity storage sections behind the door section and commodity guide flaps arranged in front of commodity columns in the vending machine shown in FIG. 3.

FIG. 3 shows the state of the commodity storage sections 13 that are arranged in the body 14 and behind the door 15 of the vending machine according to the second embodiment, with the door 15 open. More specifically, FIG. 4 shows the state of the commodity columns 11 and the commodity guide flaps 17 of the commodity storage sections 13 in the body 14, and FIG. 5 shows the state of the columns 11 and the guide flaps 17 of the storage sections 13 behind the door 15.

In the vending machine shown in these drawings, the commodity columns 11 are arranged in ten rows in its transverse direction, in the body 14 and behind the door 15. The commodity columns 11 in the three leftmost rows in the body 14 and the those in the three rightmost rows behind the door 15 are long commodity columns 11*a* for bulk-sale commodities. On the other hand, the commodity columns 11 in the seven rightmost rows in the body 14 and those in the seven leftmost rows behind the door 15 are short commodity columns 11*b*, which are divided in stages having different heights. The short columns 11*b* are commodity columns for diverse small-sale commodities.

Each of the long and short commodity columns 11 (11*a* and 11*b*) contains therein the packaged commodities 10, such as packs of cigarettes, which are classified by type or brand and stacked in layers. Also, each column 11 incorporates, in its lower portion, the commodity dispensing mechanism 12, which constitutes a bearing portion for the commodities 10 stored in layers in the column 11, and serves to dispense each lowermost commodity 10 to the front side of the column. Since the construction of the commodity dispensing mechanism 12 has no direct connection with the spirit of the present invention, its detailed description is omitted herein. The mechanism 12 may be suitably selected among various conventional feed screw mechanisms, endless belt (or chain) mechanisms, etc.

The vending machine according to the present embodiment is characterized in that the commodity storage sections 13, each including the short commodity columns 11 in a plurality of (seven) rows, are arranged in four stages in the body 14 and in three stages behind the door 15. Each storage section 13 is provided with the swingable commodity guide flap 17 that collectively covers the whole area of the front side of the commodity columns 11 except the commodity outlet. As mentioned before, the guide flap 17 is formed of, for example, a transparent flat plate, and serves mainly to guide the stacked commodities 10 in each corresponding commodity column 11 onto the underlying commodity dispensing mechanism 12 in a steady manner.

When the commodity guide flaps 17 of all the commodity storage sections 13 are closed, as shown in FIG. 1, they are situated flush with the commodity guide flaps of the other storage sections 13 above or below, thereby forming a guide wall for the commodities 10 in the free-fall space 18. The commodity dispensing mechanism 12 in the lower portion of each commodity column 11 constitutes part of the guide wall of the space 18 in a manner such that the front end face of its casing is situated on a plane defined by each guide flap 17.

As shown in FIGS. 4 and 5, the commodity guide flaps 17 are opened upward or downward to expose the front side of the commodity columns 11. Each guide flap 17 of the commodity storage section or sections 13 on the upper stage or stages, in particular, are swung up open around its top side as a pivot. On the other hand, each guide flap 17 of the storage sections 13 on the lower stages are swung down open around its bottom side as a pivot. By settling the opening direction of each guide flap 17, an operator can easily load the commodities 10 into each commodity column 11 with a reasonable working posture without using any auxiliary tool, such as a stool.

Figure 6:
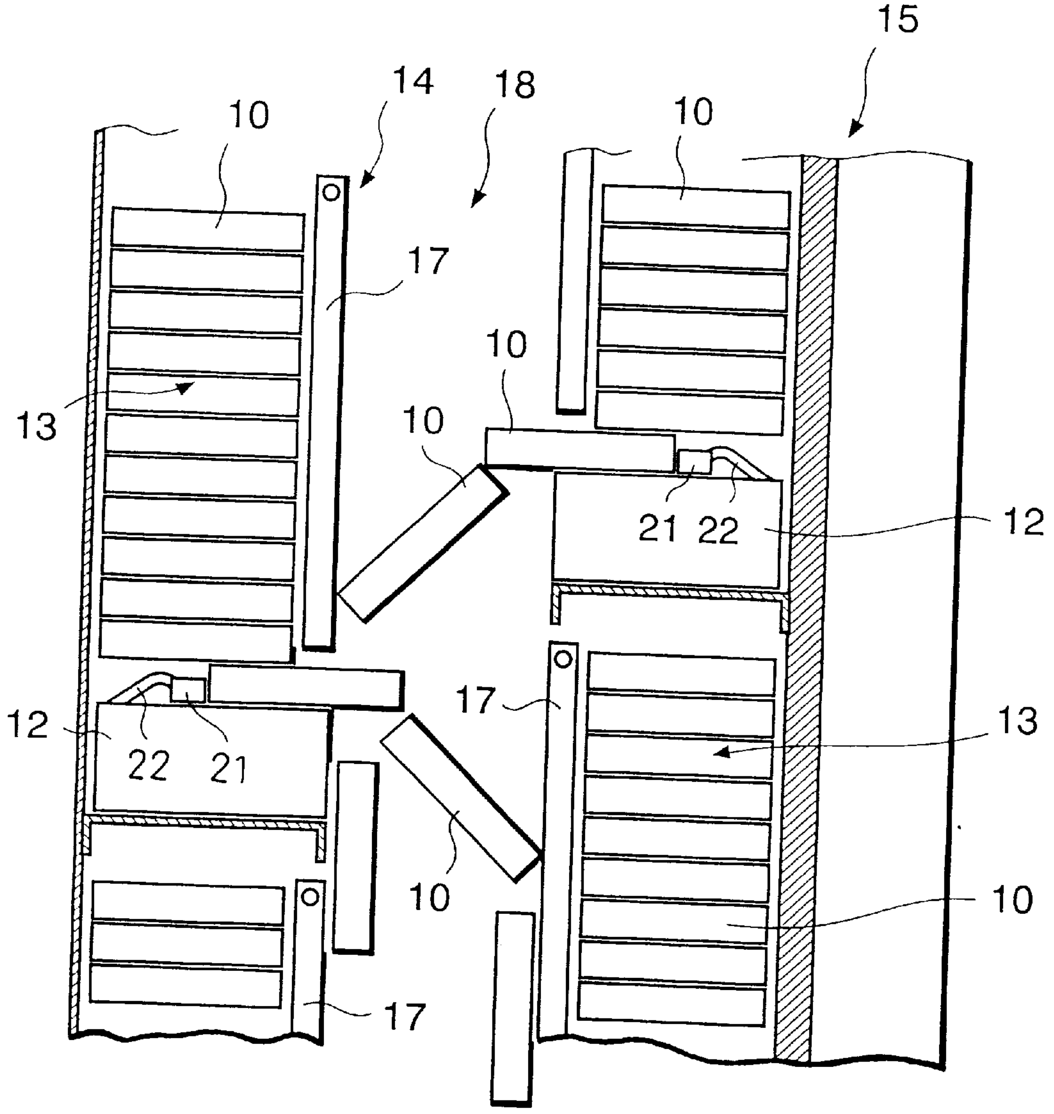
FIG. 6 is a view showing the relative positions of the commodity storage sections in the body and behind the door section in the vending machine shown in FIG. 3.

When the door 15 is closed, the commodity guide flaps 17 on the commodity storage sections 13 in the body 14 and behind the door 15 face one another in parallel relation, as shown in FIG. 6. The space defined between these guide flaps 17 has a width a little greater than the maximum diagonal length of each commodity 10, and is used as the free-fall space 18 in which the commodities 10 can fall with a free posture. Further, the commodity storage sections 13 in the body 14 and behind the door 15 are positioned so that their respective commodity dispensing portions (dispensing apertures) face the commodity guide flaps 17 of the storage sections 13 on each opposite side. Thus, the respective heights of the storage sections 13 are settled so that the heights of their dispensing portions are deviated from one another. By thus setting the respective heights of the storage sections 13, especially of the commodity dispensing portions thereof, the commodities 10 selectively dispensed from the commodity columns 11 of the commodity storage sections 13 on one side are prevented from getting into any of the commodity dispensing portions on the other side opposite thereto, and can be securely guided into the free-fall space 18 in a manner such that they are regulated in position by the commodity guide flaps 17 of the storage sections 13 on the other side. Thus, the commodities 10 can fall down with any posture in the space 18 to the commodity outlet 16.

As described above, the vending machine of the present embodiment is constructed so that the commodities 10 selectively dispensed from the commodity columns 11 can be dropped with a free posture through the free-fall space 18. Thus, the commodity dispensing mechanism 12 in the lower portion of each commodity column 11 is designed so as to be able to dispense the commodities without specially regulating their posture. Accordingly, moreover, each commodity column 11 is constructed so that the commodities 10 therein can be simply prevented from slipping out by the commodity guide flap 17 as they are guided to the commodity dispensing portion (lowest position) without being specially regulated in posture.

In a conventional vending machine, commodities dispensed from commodity columns must be guided securely into a narrow commodity chute that is attached to a door section. Therefore, the conventional vending machine is provided with a commodity guide mechanism that is adjustable in accordance with the commodity size. The guide mechanism serves to position the commodities 10 in the inner part of each commodity column 11, thereby regulating their posture of storage. Also, each commodity dispensing mechanism 12 is used to push out the commodities without changing their storage posture, thereby regulating the posture of the commodities dispensed from each commodity dispensing portion.

In the vending machine according to the present embodiment, however, the commodities 10 dispensed from the commodity columns 11 are allowed to fall down with a free posture in the free-fall space 18, so that the aforesaid commodity guide mechanism is omitted. The commodities 10 stored in the columns 11 are collectively prevented from jumping out of the columns by the commodity guide flap 17 in front of them, and are regulated in position to a degree such that their stacked state can be maintained. Each commodity dispensing mechanism 12 successively dispenses the commodities 10 in its corresponding commodity column 11 into the free-fall space 18, starting with the lowermost commodity, without specially regulating the posture of the commodities 10.

When each commodity guide flap 17 is closed with the commodities 10 stored in the commodity columns 11, it forms a flat surface that constitutes the guide wall of the free-fall space 18, in conjunction with the front end face of the casing of its corresponding commodity dispensing mechanism 12. In this vending machine, moreover, the commodity columns 11 are not provided with any commodity guide mechanism in front, so that there is no possibility of an adjustment portion of the commodity guide mechanism projecting into the space 18. Thus, the free-fall space 18 can be formed as a flat space in which the commodities 10 can fall down freely with any posture.

In FIG. 6, numeral 21 denotes a pusher that is incorporated in one of the commodity dispensing mechanisms 12. The pusher 21 presses the rear end portion of the commodity 10 in the lowest position in the commodity column 11, thereby pushing out (or dispensing) the commodity into the free-fall space 18 through the commodity dispensing aperture. Numeral 22 denotes a sellout detection switch. The detection switch 22 is activated in response to a load from the commodities 10 in the commodity column 11, and detects a sellout. This switch 22 may be replaced with, for example, a pressure sensor that detects the overall weight of the commodities 10 in the commodity column 11, and converts the detected weight into the number of the commodities. Also, the switch (pressure sensor) 22 may be used to detect a commodity weight lower than a preset value (threshold value for decision), thereby monitoring the number of the remaining commodities 10. In this case, the absence of stock should be indicated by "0" for the detected weight, for example.

The commodity guide flap 17 attached to each commodity storage section 13, as mentioned before, is designed so as to rock upward or downward around its upper or lower end portion as a pivot, thereby exposing the front of the commodity columns 11. As shown in FIGS. 7A, 7B and 7C or FIGS. 8A, 8B and 8C, each guide flap 17 has rocking pins 32 on its pivot side, and is supported for vertical movement and rocking motion with the pins 32 fitted individually in slots 31 that are formed individually in side walls 13*a* of the storage section 13. A retaining portion 33 having a semicircular arcuate surface is provided on the rocking end side of each commodity guide flap 17. The retaining portion 33 can get into a cut portion 34 in one of the side walls 13*a*. A stopper 35 is incorporated in the cut portion 34 so as to be able to engage the retaining portion 33. The stopper 35 is formed of a synthetic resin, for example, and is urged upward by an elastic strip 36 that is formed integrally on its proximal end portion. Thus, when the commodity guide flap 17 is closed, the stopper 35 engages the retaining portion 33 on the rocking end side of the flap 17, and in conjunction with the slots 31, restrains the flap 17 from moving back and forth, thereby holding the flap 17 in position.

Figure 7A:
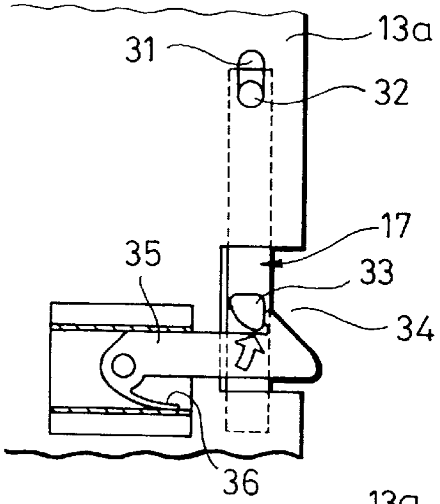
FIG. 7A is a view showing an arrangement of an upwardly openable commodity guide flap and its locking mechanism.
Figure 7B:
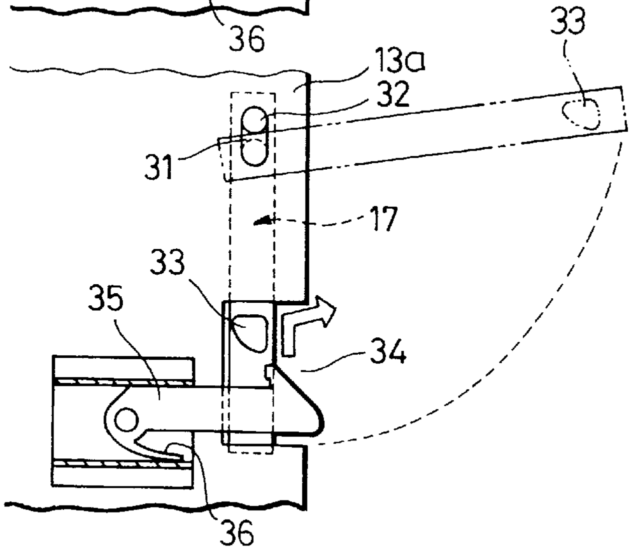
FIG. 7B is a view showing the commodity guide flap of FIG. 7A in an open state.
Figure 7C:
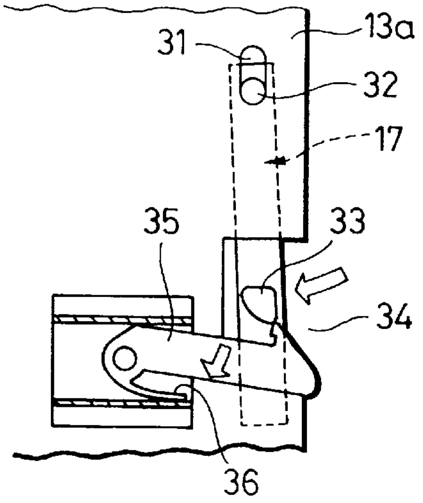
FIG. 7C is a view for illustrating the way the commodity guide flap of FIG. 7A is locked by means of the locking mechanism as it is closed.

The stopper 35 shown in FIGS. 7A, 7B and 7C, in particular, plays an important role in preventing the commodity guide flap 17 from being opened unexpectedly, since an outward force acts on the rocking end portion of the flap 17 as one of the commodities 10 is dispensed through the commodity dispensing aperture at the bottom of the commodity column 11. Likewise, the stopper 35 shown in FIGS. 8A, 8B and 8C plays an important role in preventing the commodity guide flap 17 from being opened unexpectedly, since an outward force acts on the rocking end portion of the flap 17 as one of the commodities 10 is dispensed through the commodity dispensing aperture at the top of the commodity column 11.

In the case where the commodity guide flap 17 is adapted to be opened upward with the commodity dispensing aperture at the top of the commodity column 11, a force acts only on the proximal portion (support portion) of the flap 17 as the commodity 10 is dispensed, and the rocking end portion of the flap 17 cannot be subjected to any undue force. In this case, therefore, the commodity storage section 13 need not be provided with the stopper 35 of the construction shown in FIGS. 7A, 7B and 7C. Also in the case where the commodity guide flap 17 is adapted to be opened downward with the commodity dispensing aperture at the bottom of the commodity column 11, the stopper 35 of the construction shown in FIGS. 8A, 8B and 8C can be omitted.

Figure 8A:
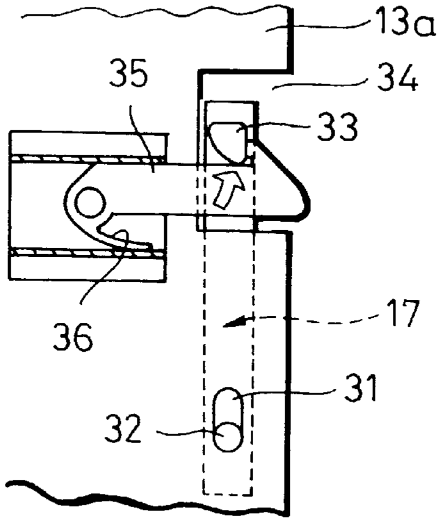
FIG. 8A is a view showing an arrangement of a downwardly openable commodity guide flap and its locking mechanism.
Figure 8B:
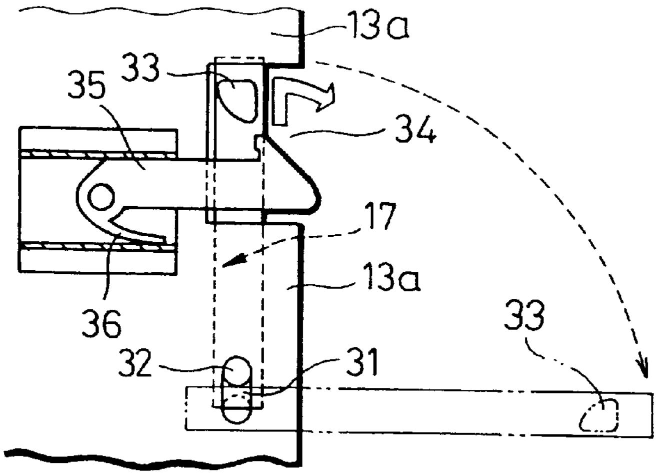
FIG. 8B is a view showing the commodity guide flap of FIG. 8A in an open state.
Figure 8C:
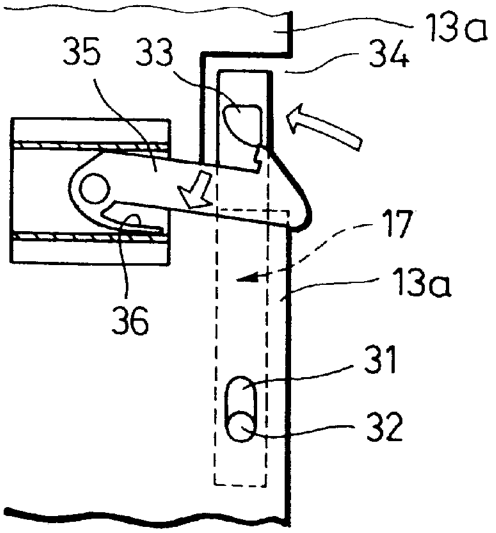
FIG. 8C is a view for illustrating the way the commodity guide flap of FIG. 8A is locked by means of the locking mechanism as it is closed.

In opening the commodity guide flap 17, as shown in FIG. 7B or 8B, the flap 17 is slightly lifted up along the slots 31, whereupon the retaining portion 33 is disengaged from the stopper 35. Then, the rocking end of the guide flap 17 is pulled forward so that the flap 17 is rocked upward or downward. Thus, the flap 17 is opened.

In the case where the commodity guide flap 17 is adapted to be opened upward, as shown in FIG. 7B, it should be provided with, for example, a magnet (not shown) that can be attracted to a magnet catcher (not shown) attached to the upper portion of the commodity storage section 13, whereby the flap 17 can be held in its open position. In the case where the commodity guide flap 17 is adapted to be opened downward, as shown in FIG. 8B, a chain 37 may be stretched between one of the side walls 13*a* of the storage section 13 and the guide flap 17, thereby restricting the rocking angle (opening angle) of the flap 17, as shown in FIG. 5, for example. The chain 37 serves to keep the guide flap 17 open downward.

In closing the upwardly opened commodity guide flap 17, on the other hand, the flap 17 is pushed down against the magnetic force of the magnet catcher, whereupon it rocks downward by its own weight. As the commodity guide flap 17 rocks in this manner, the retaining portion 33 of the flap 17 gets into the cut portion 34 of the side wall 13*a*. Then, the retaining portion 33 abuts against the distal end of the stopper 35, and gets inside the distal end while pushing down the stopper 35. Thus, the retaining portion 33 engages the stopper 35 that is elastically restored by the elastic strip 36, whereupon the commodity guide flap 17 is locked in the position where it covers the front of the commodity columns 11, as shown in FIG. 7A.

In closing the downwardly opened commodity guide flap 17, the flap 17 held in a horizontal position by the chain 37 is lifted up, and its rocking end portion is fitted into the cut portion 34 of the side wall 13*a*. Thereupon, the retaining portion 33 abuts against the distal end of the stopper 35, and gets inside the distal end while pushing down the stopper 35. Thus, the retaining portion 33 engages the stopper 35 that is elastically restored by the elastic strip 36, whereupon the commodity guide flap 17 is locked in the position where it covers the front of the commodity columns 11, as shown in FIG. 8A.

As shown in FIG. 5, a tension spring 38 may be stretched between one of the side walls 13*a* of the commodity storage section 13 and each commodity guide flap 17. The spring 38 is stretched to its maximum in an intermediate position between the position in which the guide flap 17 is closed and the position in which the flap 17 is open, as mentioned before, and serves as a revering spring that changes its pulling direction when the flap 17 reaches the intermediate position. This tension spring 38 urges the commodity guide flap 17 to rock downward when the flap 17 is opened so as to get beyond the intermediate position (neutral point). As a result, the guide flap 17 can be stably held in its open position regulated by the chain 37. When the guide flap 17 is swung up from the open position so as to get beyond the neutral point (maximum extension position) of the tension spring 38, on the other hand, it starts to be urged upward by the spring 38. As a result, the guide flap 17 is closed automatically. Thus, the commodity guide flap 17 can be opened and closed with a small force by utilizing the urging force of the tension spring 38.

With use of this arrangement in which the commodity guide flap 17 is opened and closed by means of the tensile force of the tension spring 38, the guide flap 17 can be easily opened and closed even though it is large enough collectively to cover the front of the commodity columns 11 that are arranged side by side in each commodity storage section 13. Moreover, the stopper 35 in the cut portion 34 is urged to rock and engage the retaining portion 33 of the commodity guide flap 17 by means of the elastic force of its own elastic strip 36, thereby securely locking the flap 17 in its closed state. Since the stopper 35, in conjunction with the slots 31, restrains the guide flap 17 from moving back and forth, the flap 17 and its supporting means can enjoy very simple structures.

If the commodity guide flap 17 is designed so that it can be closed by falling down by its own weight, as mentioned before, or by utilizing the tensile force of the tension spring 38, it can be automatically closed by means of a device that causes it to rock slightly downward or upward when the door 15 is about to be closed with the flap 17 open. Thus, the commodity guide flaps 17 can be securely closed if they fail to be manually closed before the door 15 is closed.

For example, this device can be obtained by providing a partition plate (side wall 13*a* of the commodity storage section 13) 40 in the body 14 with notch guide portions 41, as shown in FIG. 4. Each notch guide portion 41 can engage the upper end portion (rocking end portion) of the open commodity guide flap 17 of its corresponding commodity storage section 13 on the door side. Further, the guide portion 41 serves to guide the guide flap 17 to the position where the flap 17 is automatically closed by means of the urging force of the tension spring 38, in a manner such that the upper end portion of the guide flap 17 shifts its position upward along a guide surface of the guide portion 41. The door 15 is also provided with similar guide members (not shown). Each guide member is adapted to engage the upper end of the open commodity guide flap 17 of its corresponding commodity storage sections 13 on the body side. The guide member causes the commodity guide flap 17 upward (or downward), thereby guiding it to the position where the flap 17 can be closed automatically.

In the vending machine constructed in this manner, the space defined between the commodity guide flaps 17 attached individually to the respective front faces of the commodity storage sections 13 in the body 14 and the inside of the door 15 is used as the free-fall space 18 for the commodities 10 selectively dispensed from the commodity columns 11. Alternatively, the space defined between the commodity guide flaps 17 attached individually to the respective front faces of the commodity storage sections 13 in the body 14 and behind the door 15 is used as the free-fall space 18 for the commodities 10 selectively dispensed from the commodity columns 11. Accordingly, this vending machine need not be provided with any narrow commodity chute such as the conventional one, so that its construction can be simplified considerably. In the vending machine with the aforementioned construction, in particular, the narrow commodity chute need not be incorporated in the door 15, so that the commodity storage sections 13 can be arranged also on the back of the door 15, as shown in FIG. 6, so that the commodity columns can be increased in number.

In the vending machine according to the present embodiment, moreover, the commodities 10 are only guided to the commodity outlet 16 by being freely dropped with any posture. Accordingly, in this vending machine, the posture of the commodities 10 need not be regulated in the commodity columns 11 or the commodity outlet, and there is no need of any commodity guide mechanism for correcting the posture of the commodities. Although this vending machine requires use of the aforesaid free-fall space 18 that has the width greater than the maximum diagonal length of each commodity 10, therefore, the space for the commodity guide mechanism can be be omitted, so that depth of the machine can be shortened. Thus, according to the present invention, the extra space between the front side of the commodity columns 11 and the commodity chute, which is required by the adjustment portion of the commodity guide mechanism that projects in front of the commodity columns 11, can be eliminated. Since the commodity guide flaps 17 themselves in front of the commodity columns 11 serve as the guide wall of the free-fall space 18, moreover, the overall depth of the vending machine can be shortened.

The free-fall space 18 can be defined only when the vending machine is activated with its door 15 closed, and serves as the working space through which the commodities 10 are loaded into the commodity columns 11 when the door 15 is opened. Thus, the operating efficiency can be improved satisfactorily. In general, the vending machine requires neither special mechanisms (units) such as commodity chutes, which are used to transport the commodities dispensed from the commodity columns 11, nor various mechanisms for correcting the posture of the commodities 10. Accordingly, the vending machine can be simplified in construction and lowered in cost.

The numbers of commodity storage sections 13 on the body side and on the door side, the number of commodity columns 11 in each storage section 13, and the length of each column 11 may be settled depending on the specifications. The packaged commodities 10 are not limited to packs of cigarettes, and the present invention may be applied to vending machines for various packaged commodities in the form of small boxes. In this case, it is advisable to settle the size of each commodity column 11 and the like in accordance with the package size of the commodities 10.

In the embodiments described above, moreover, the commodities 10 in each commodity column 11 move downward by its own weight, and are successively dispensed from the column 11, the lowermost one first. However, the invention may be also applied to a vending machine provided with commodity columns 11 that are arranged so that commodities 10 in each column 11 are lifted up by means of a spring force or the like, and are successively dispensed, the uppermost one first. In this case, a commodity dispensing mechanism 12 is located in the upper portion of each column 11, and its pusher faces downward.

Figure 9:
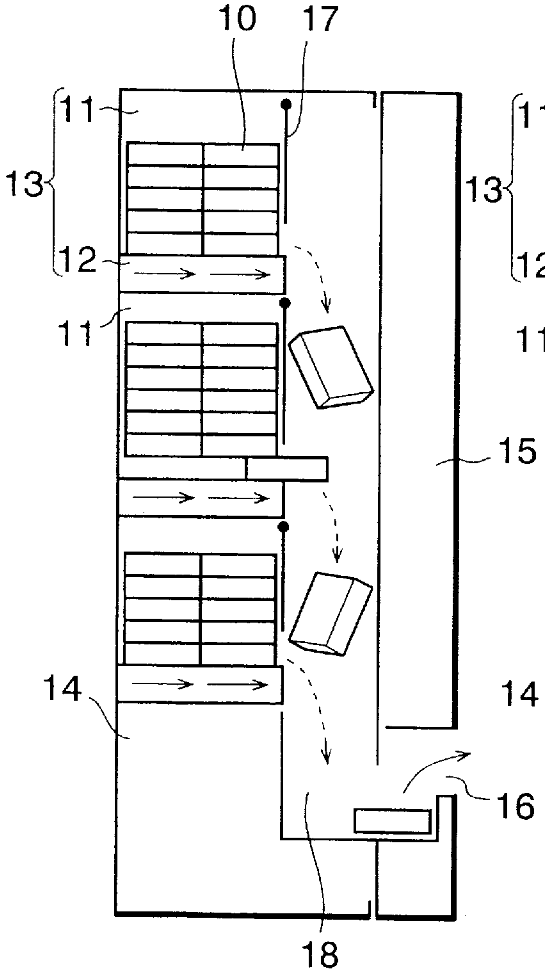
FIG. 9 is a view showing the relation between commodity storage sections and a commodity chute of a vending machine according to a third embodiment of the invention.
Figure 10:
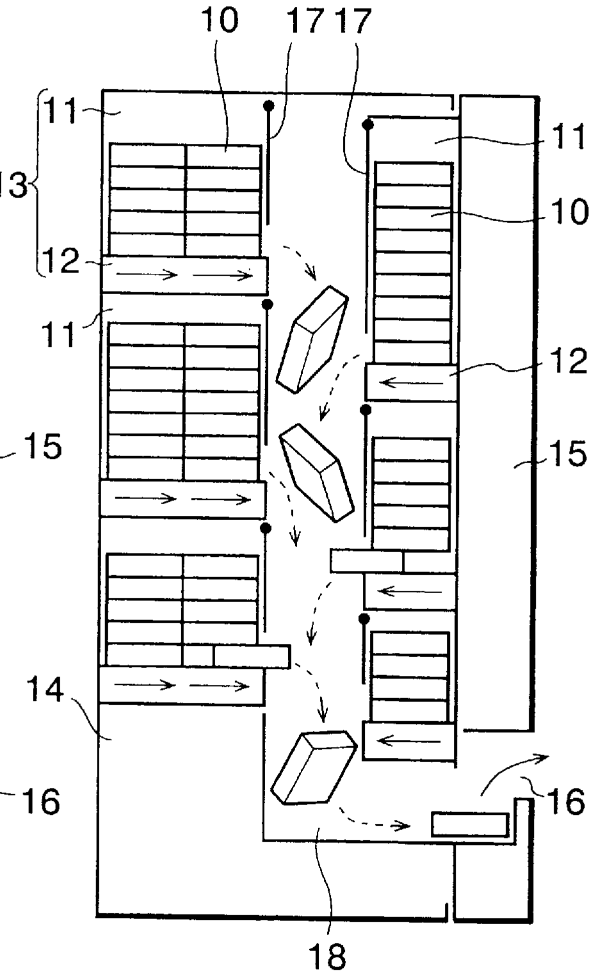
FIG. 10 is a view showing the relation between commodity storage sections and a commodity chute of a vending machine according to a fourth embodiment of the invention.
Figure 11:
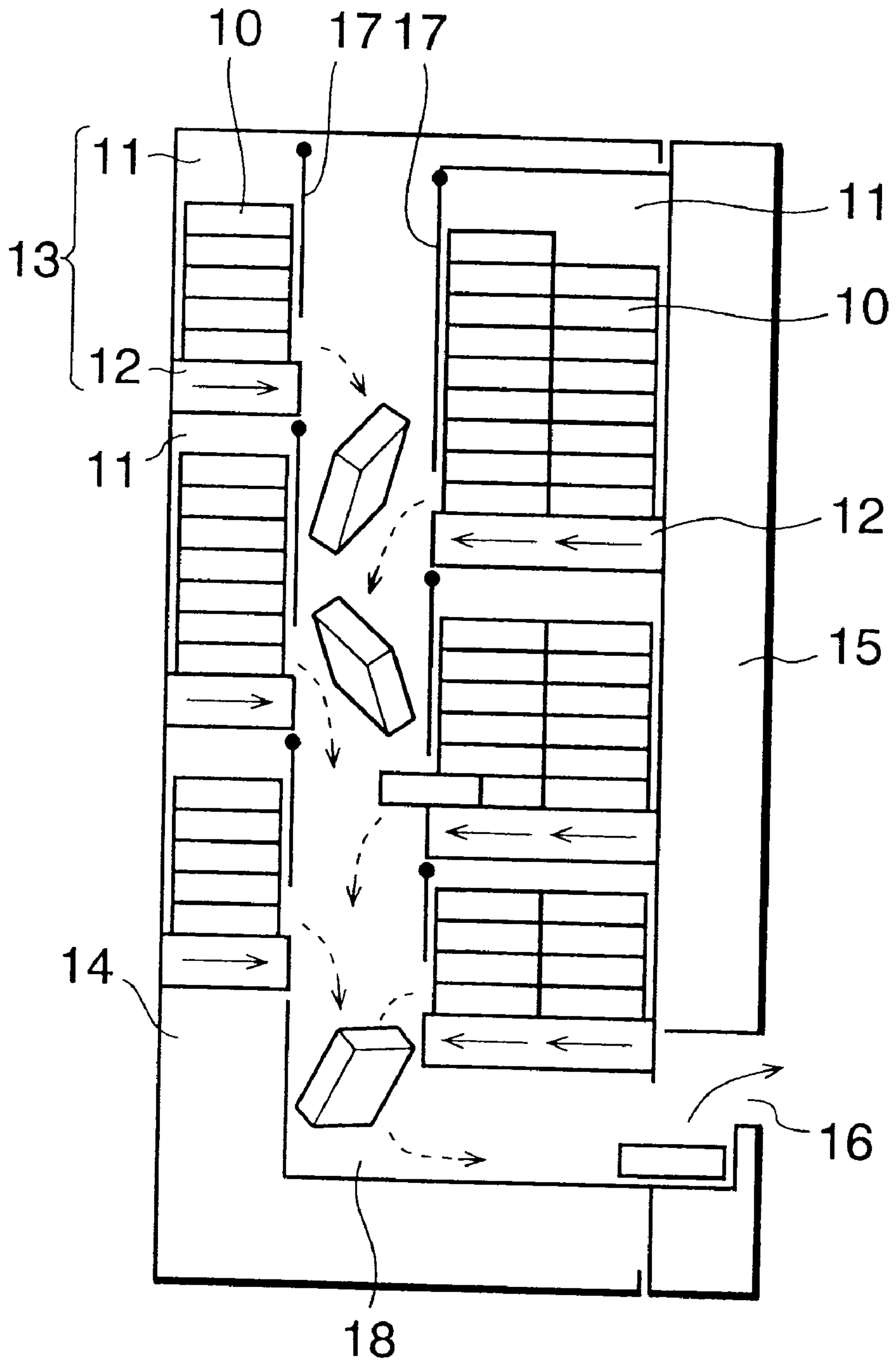
FIG. 11 is a view showing the relation between commodity storage sections and a commodity chute of a vending machine according to a fifth embodiment of the invention.
Figure 12:
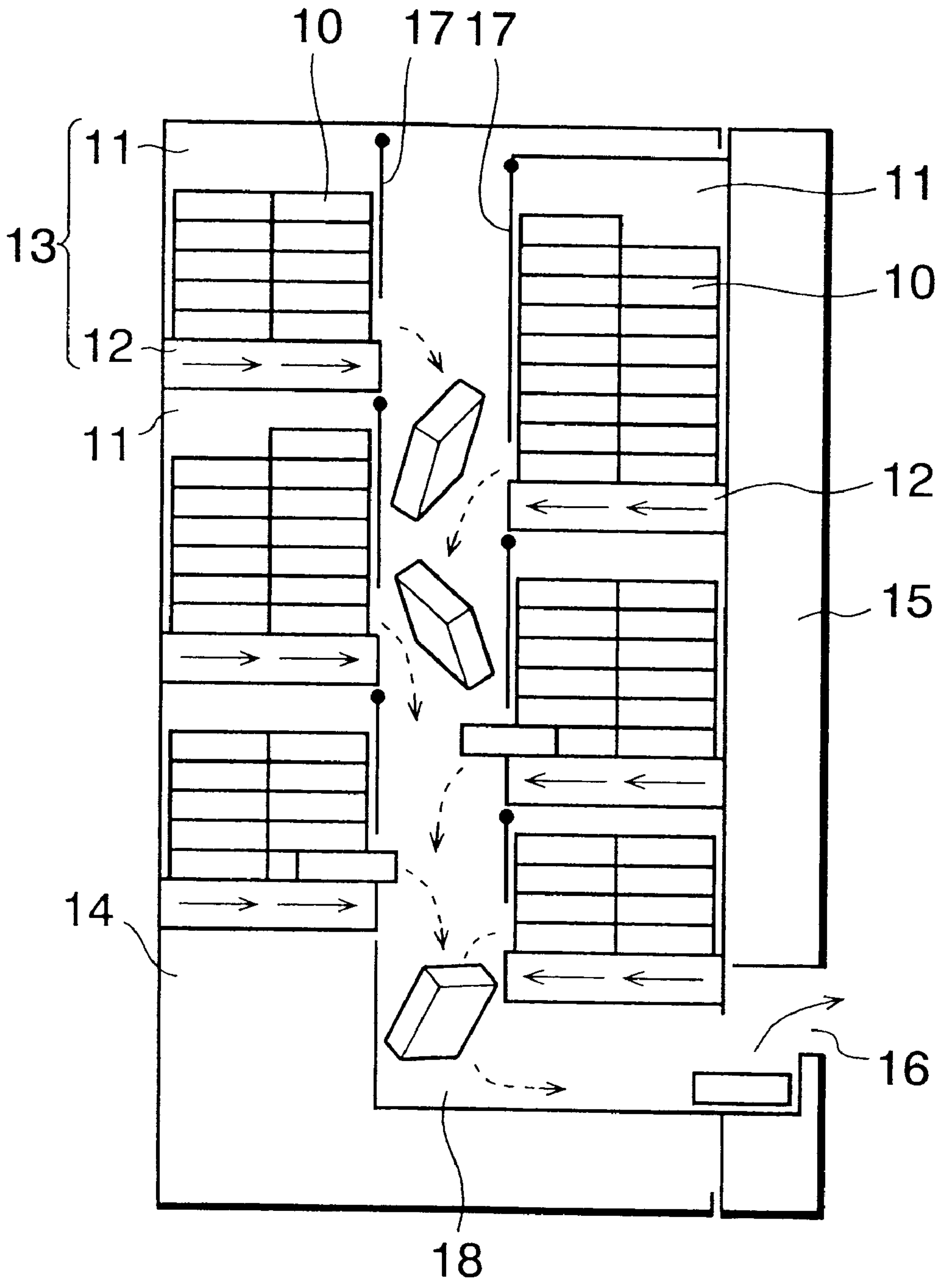
FIG. 12 is a view showing the relation between commodity storage sections and a commodity chute of a vending machine according to a sixth embodiment of the invention.

Commodity columns 11 in the body 14 shown in FIG. 9 or 10 have a so-called double-column structure such that commodities 10 are arranged in two rows, front and rear, and are successively dispensed forward. As shown in FIG. 11 or 12, moreover, commodity columns 11 behind the door 15 may be also of a double-column structure.

The commodity guide flap 17 according to the foregoing embodiments is provided for each commodity storage section 13, and collectively covers the front side of the commodity columns 11 that constitute the storage section 13 in each stage. Alternatively, however, a narrow commodity guide flap may be swingably attached to each commodity column 11. In this case, the aforesaid free-fall space 18 for the commodities 10 is defined by the guide flap.

Figure 13:
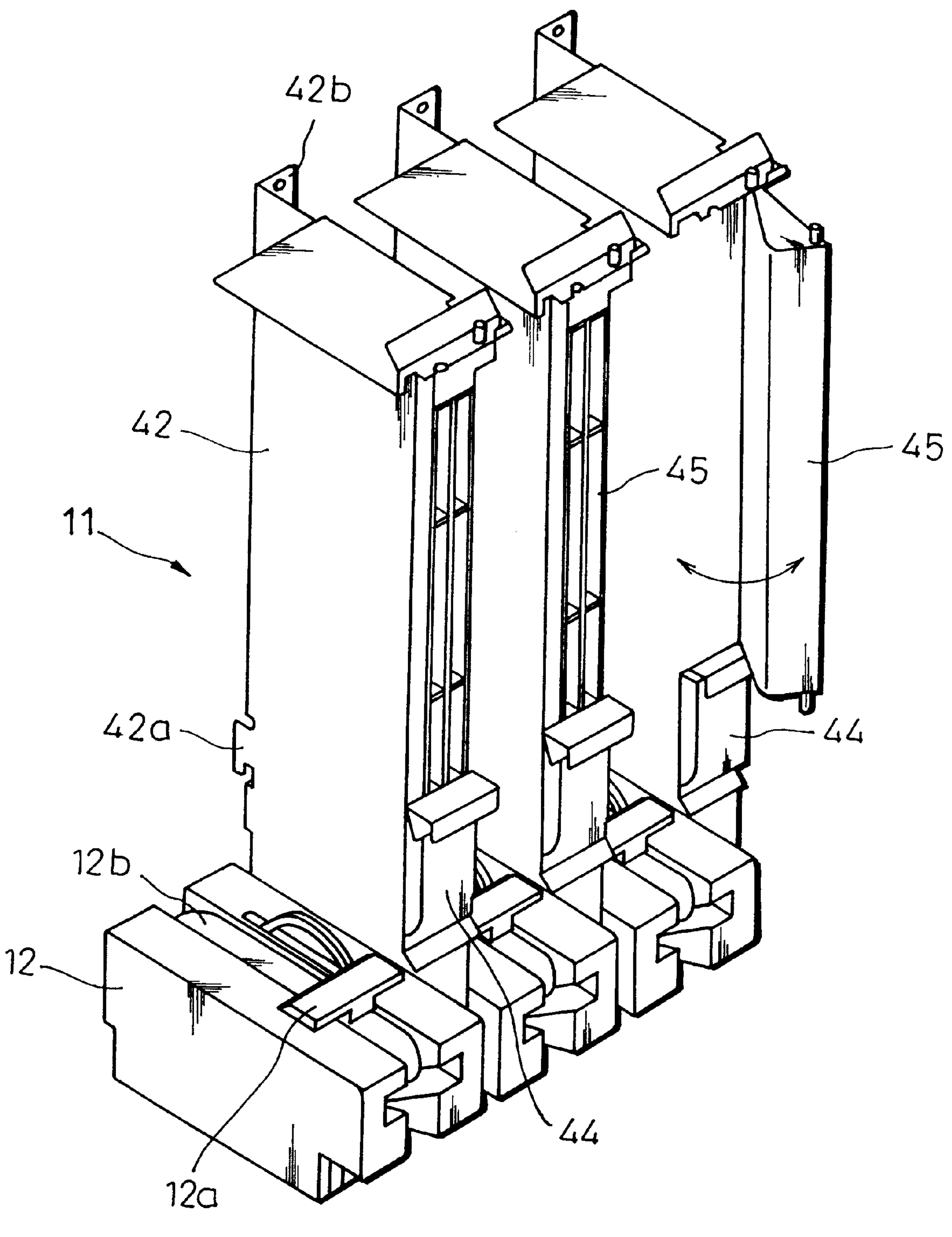
FIG. 13 is a view showing an outline of commodity columns and their surroundings of a vending machine according to still another embodiment of the invention.

FIG. 13 is schematic view showing the commodity columns 11 of a vending machine according to this embodiment and their surroundings. These commodity columns 11 are vertically elongate commodity storage spaces divided by a plurality of partition plates 42 that are fixed to a rear panel (not shown) of the vending machine body. Each partition plate 42 is formed integrally with a top plate of each commodity column 11 of which the upper end is bent in the shape of an L, for example. Each plate 42 is fixed to the rear panel of the machine body in a manner such that a lug 42*a* on the lower portion of its inner end is fitted in one of slits (not shown) in the rear panel and that a fixing piece 42*b* on the upper portion of the inner end is screwed to the rear panel, for example.

Further, commodity dispensing mechanisms 12 are arranged individually in the respective lower portions of the commodity columns 11 that are divided by the partition plates 42. Each dispensing mechanism 12 has a casing of which the top surface serves as a bearing surface for the commodities 10 that are stacked in layers in each commodity column 11. Also, each mechanism 12 is provided with a pusher 12*a*, which projects above its top surface (bearing surface) and can move forward from the inner part of each corresponding commodity column 11, thereby pushing out one of the commodities 10. The commodity dispensing mechanism 12 shown in FIG. 13 is constructed so that an endless belt 12*b*, which can travel along its top surface, is fitted with the pusher 12*a* that is wider than the belt 12*b*. As mentioned before, however, the commodity dispensing mechanisms of the conventional type may be used as required.

Each commodity column 11, which is formed of an open-front commodity storage space defined by the top surface of the commodity dispensing mechanism 12 as its floor surface and each partition plate 42 as its side face, is provided with a stopper portion 44 in the lower position on the front side and a narrow swingable commodity guide flap 45 located over the stopper portion 44. The stopper portion 44 is formed by laterally bending the lower portion of the front end of the partition plate 42, for example, and is situated over the commodity dispensing mechanism 12.

A commodity dispensing portion (commodity dispensing aperture) is defined between the stopper portion 44 and the front end side of the top surface of the commodity dispensing mechanism 12. As the dispensing mechanism 12 is actuated to push out the lowermost commodity 10 through the dispensing aperture, the stopper portion 44 engages the front end portion the subsequent commodity on the lowermost one, thereby preventing the subsequent commodity from moving. Thus, the stopper portion 44 serves to prevent the subsequent commodity 10 from being unexpectedly dispensed along with the lowermost commodity 10. The stopper portion 44 is narrower than (about half as wide as) the commodity column 11, so that it cannot cover the overall width of the lower portion of the front face of the column 11. In other words, a given space (gap) is formed between the side wall surface (partition plate 42) of the commodity column 11 and the stopper portion 44. This space is wide enough to receive the operator's fingers during commodity loading operation, and serves as a window through which the commodities 10 remaining on and over the commodity dispensing mechanism 12 can be recognized with ease even when they are scarce. Permitting the insertion of the operator's fingers, moreover, this space facilitates the loading operation.

The commodity guide flap 45, which is swingably attached to the front face of each commodity column 11, is formed of a vertically elongate, transparent plastic molding, for example, and is situated over the stopper portion 44. This guide flap 45 is mounted on one side portion of the front face of the commodity column 11 for rocking motion around its own right-hand end portion as a pivot, so that it can rock sideways, thereby exposing the front of the column 11. In particular, the guide flap 45 is urged to rock by an elastic member, such as a coil spring (not shown), attached to its pivotal portion, and normally, is situated in front of the commodity column 11.

The commodity guide flap 45, like the stopper portion 44, is narrower than the commodity column 11. When the guide flap 45 is situated in front of the commodity column 11, a given space (gap) is defined between its left-hand end portion or rocking end portion and the side wall surface of the column 11. Thus, even if the guide flap 45 is opaque and when it is closed, therefore, the state and type or brand of the commodities contained in the commodity column 11 can be easily observed through the gap that extends from the lateral portion of the stopper portion 44.

Figure 14:
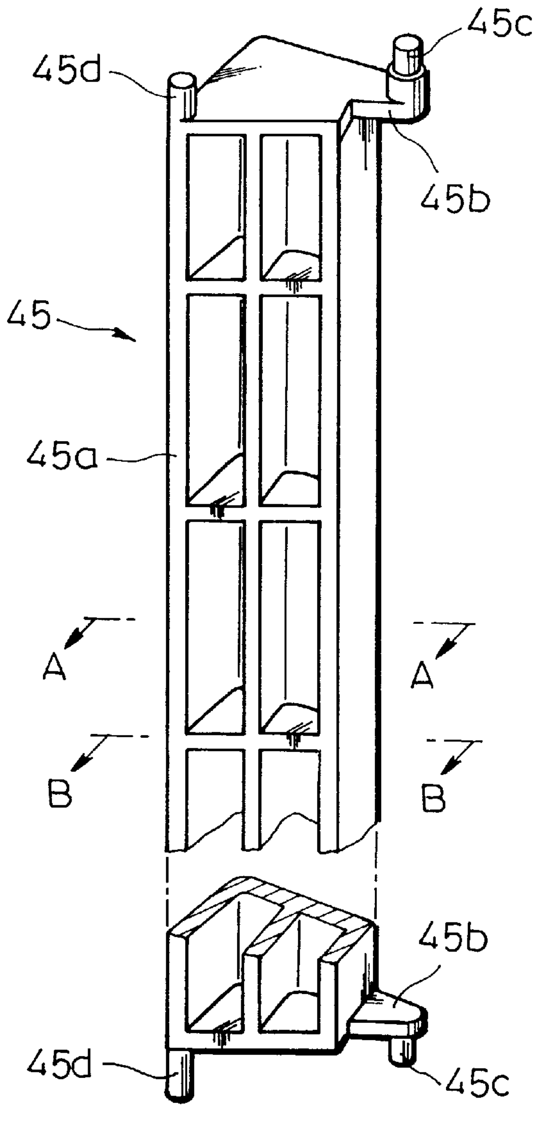
FIG. 14 is a perspective view showing an arrangement of a commodity guide flap to be attached to the front of each commodity column of the vending machine of FIG. 13.
Figure 15A:
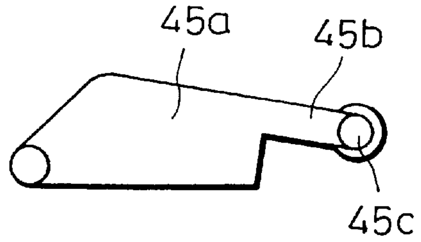
FIG. 15A is a plan view of the commodity guide flap shown in FIG. 14.
Figure 15B:
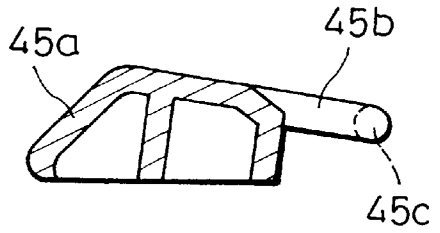
FIG. 15B is a sectional view of a main body portion of the commodity guide flap taken along line A—A of FIG. 14.
Figure 15C:
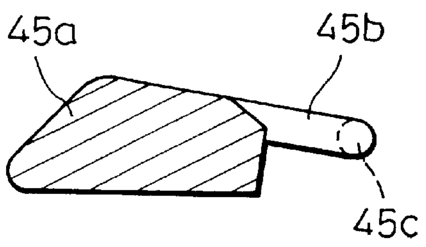
FIG. 15C is a sectional view of a crosspiece portion of the commodity guide flap taken along line B—B of FIG. 14.

As shown in the outline drawing of FIG. 14, the commodity guide flap 45 in front of the commodity column 11 is substantially in the form of a flat rod-shaped member having a triangular cross section. FIGS. 15A, 15B and 15C show the shape of the upper end face of the guide flap 45, the cross-sectional shape of a main body portion of the flap 45, and the cross-sectional shape of a crosspiece portion of the flap 45, respectively.

Thus, the commodity guide flap 45 is formed of a vertically elongate body that extends along the front face of the commodity column 11, and its main body portion 45*a* is provided with support pieces 45*b*, which protrude sideways (at the right-hand end of the guide flap 45) from its upper and lower ends, individually. A support pin 45*c* for use as a pivot for the guide flap 45 protrudes from the extreme end portion of each support piece 45*b*. The commodity guide flap 45 is rockably supported in a manner such that its right-hand end is situated on the one side portion of the front face of the commodity column 11 and that the support pins 45*c* are fitted individually in bearing portions (not shown) that are provided in the aforesaid top plate and the stopper portion 44, individually.

A pin 45*d* protrudes from that portion of the upper end of the main body portion 45*a* which is situated on the side opposite to the support pin 45*c*, that is, from the left-hand end portion of the commodity guide flap 45. Another pin 45*d* protrudes the lower end the main body portion 45*a* in like manner. When the guide flap 45 is situated in front of the commodity column 11, these pins 45*d* engage an edge portion of the top plate and a side portion of the upper edge the stopper portion 44, individually. The pins 45*d* function as stoppers for positioning the commodity guide flap 45 with respect to the exposed front of the commodity column 11.

The main body portion 45*a* of the commodity guide flap 45 has a vertical surface (front face) that extends parallel to the front face of the commodity column 11 when the flap 45 is situated in front of the column 11. The rear face of the main body 45*a* is composed of two slopes that project toward the inner part of the commodity column 11. An angled portion that extends vertically along the boundary between these two slopes constitutes a guide portion 45*e* for regulating the position of the front end portion of each commodity 10 in the commodity column 11. Thus, the guide portion 45*e* is formed as an angled portion, which projects at the back of the commodity guide flap 45 and is situated behind the rocking end that defines the surface position of the flap 45.

In other words, the commodity guide flap 45 is conceptually composed of a right-hand side portion as its pivot corresponding to one vertex of its triangular cross section, a left-hand side portion as its rocking end corresponding to another vertex, and the vertical surface (front face) extending parallel to the front face of the commodity column 11 and corresponding to a line that connects the two vertexes. The backwardly projecting guide portion 45*e* corresponds to the remaining vertex, and the two slopes that connect the guide portion 45*e* and the left- and right-hand end portions form the rear face of the guide flap 45.

Actually, the main body portion 45*a* of the commodity guide flap 45 is in the form of a box having a recess on the front side, as shown in FIG. 14. A vertical frame portion and a plurality of horizontal crosspiece portions are arranged in the recess, whereby the box-shaped guide flap 45 can maintain its overall strength despite its reduced weight. The front face of the commodity guide flap 45 having this configuration is realized as a plane that is defined by front edge portions extending along the respective side portions of the rear slopes and the respective front faces of the frame and crosspiece portions. Practically, the front face can be regarded as one flat surface. Thus, although the front face of the commodity guide flap 45 has the recess divided by the frame and crosspiece portions, it substantially constitutes one plane.

Further, the commodity guide flap 45, which is swingably attached to the front face of the commodity column 11 in the aforesaid manner, basically serves to regulate the positions of the respective front end portions of the commodities 10 that are stored in layers in the commodity column 11, thereby preventing the commodities from slipping off, and to guide the commodities 10 in the column 11 onto the commodity dispensing mechanism 12.

Figure 16:
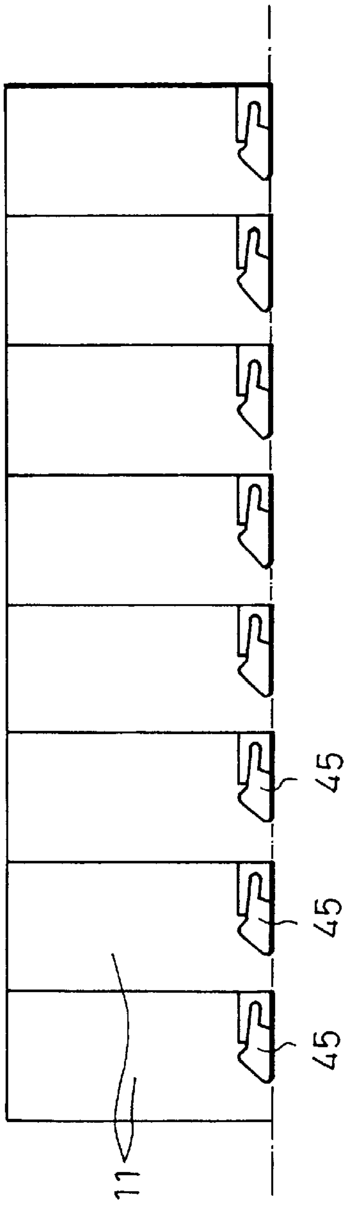
FIG. 16 is a schematic plan view showing an arrangement of a commodity storage section formed of a plurality of commodity columns provided with the commodity guide flap of FIG. 14 each.

Having these basic functions, each commodity guide flap 45 forms a part of one plane that is set in association with a plurality of commodity columns 11 arranged side by side, as shown in FIG. 16, and therefore, with the commodity storage sections 13 arranged in stages. In other words, the respective front faces of the guide flaps 45 can be regarded substantially as one extensive plane, which can be used as the guide surface of the free-fall space 18 for guiding the commodities 10 selectively dispensed from the commodity columns 11 to the commodity outlet 16. Thus, the commodity guide flaps 45, like the aforementioned commodity guide flaps 17, constitutes the wall surface of the free-fall space 18.

The commodities 10 can be loaded into each commodity column 11 by laterally rocking each corresponding commodity guide flap 45 against the urging force of the aforesaid coil spring, thereby exposing the front of the column 11, and then successively stacking the commodities 10 in layers in the column 11. When loading the commodities 10 is finished, the commodity guide flap 45 is released from the retention in the open position. Thereupon, the guide flap 45, which is urged to rock by the coil spring, automatically rocks and returns to the position in front of the commodity column 11, thereby covering the front of the column 11. While the commodities 10 are being loaded into the commodity column 11, therefore, the commodity guide flap 45 is bound to be closed unless the operator manually holds the flap 45 in its open position, for example. Normally, therefore, the guide flap 45 never fails to be closed.

Since one hand of the operator must be used to hold the commodity guide flap 45 in the open position, however, the operator must load the commodities 10 by the other hand only, so that the operating efficiency is not very high. According to the commodity guide flap 45 with the aforementioned construction, however, the operator can open it with the lateral portions of the commodities 10 held against its rocking end as the commodities 10 are loaded into the commodity column 11. Thus, the operating efficiency can be improved.

Figure 17:
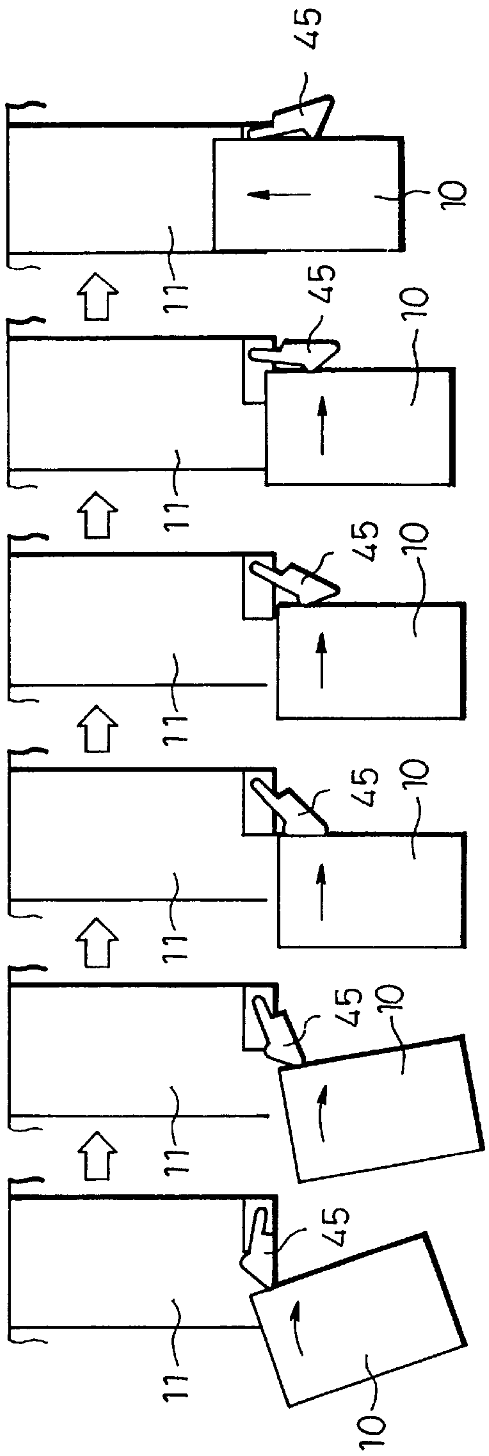
FIG. 17 is a view showing processes for loading commodities into the commodity columns having the commodity guide flap of FIG. 14 each.

More specifically, the rocking end (left-hand end) of the commodity guide flap 45 is situated ahead of the front end portion of each commodity 10 in the commodity column 11 that is regulated in position by the guide portion 45*e* on the rear face of the flap 45. Further, the guide flap 45 is narrower than the column 11, and the aforesaid space is defined between the rocking end of the flap 45 and the side wall surface of the column 11. FIG. 17 shows several processes for loading a commodity 10 into the commodity column 11. As shown in FIG. 17, the rocking end of the commodity guide flap 45 is first hooked and pried open with a front-end side portion of the commodity 10, and the commodity 10 is then moved transversely. By doing this, the guide flap 45 is swung wide open to expose the front of the commodity column 11. Then, the commodity 10 is pushed into the column 11 with the guide flap 45 kept open by means of the side portion of the commodity 10. When the commodity 10 finishes being forced into the column 11, the guide flap 45 is released from the retention in the open position by the commodity, so that it rocks and returns to its original position, thereby covering the front of the column 11.

By repeating these processes, the commodities 10 can be successively loaded into the commodity column 11. Accordingly, the operator need not manually hold the commodity guide flap 45 in the open position, so that he can use both his hands to carry out the loading operation efficiently. Also in the case where the operator holds a commodity package (e.g., parcel of cigarette packs) in one of his hands as he loads the commodities 10 in the package into the commodity column 11 with the other hand, he need not keep the guide flap 45 open with his elbow, for example. Thus, the loading operation can be facilitated.

As mentioned before, the gap (space with a given width) extends from the lateral portion of the stopper portion 44 to the lateral portion of the rocking end of the commodity guide flap 45. Accordingly, a commodity 10 can be easily removed from the commodity column 11 to be replaced with a new one. In doing this, fingers are inserted into the gap to hold the front end portion of the commodity 10 vertically, and the commodity 10 in this state is situated behind the guide flap 45. If the fingers are pulled with the commodity 10 between them, the guide flap 45 is compulsorily pushed forward and rocked, thereby exposing the front of the commodity column 11. As a result, the commodity 10 can be easily taken out of the column 11. Thus, the removal of the commodities 10 from the commodity columns 11, as well as the loading operation, can be carried out with ease.

Figure 18:
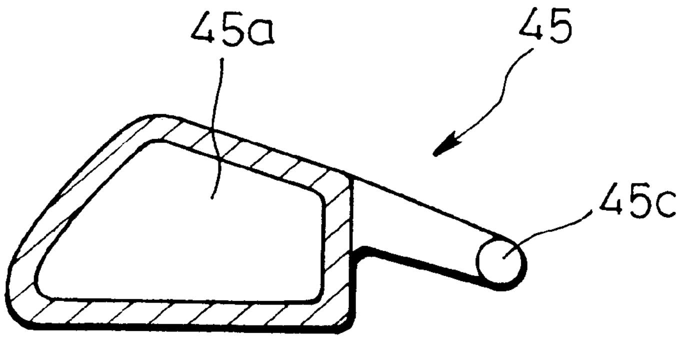
FIG. 18 is a sectional view showing a modification of the commodity guide flap of FIG. 14.
Figure 19:
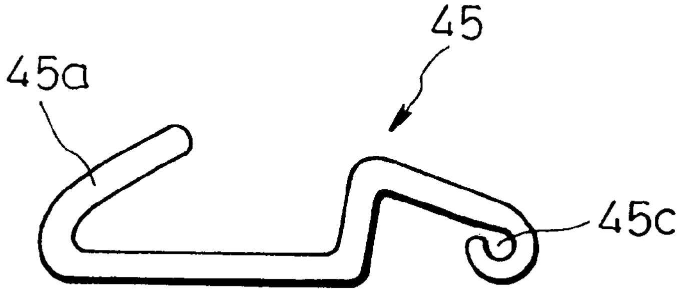
FIG. 19 is a plan view showing another modification of the commodity guide flap of FIG. 14.
Figure 20:
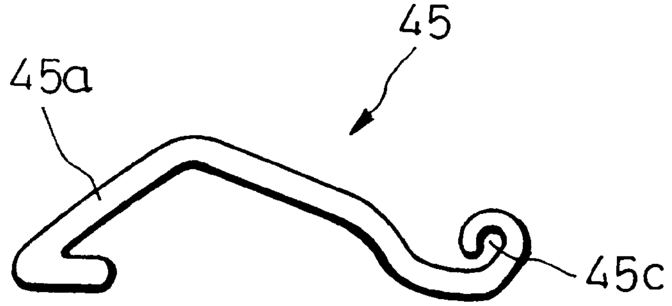
FIG. 20 is a plan view showing still another modification of the commodity guide flap of FIG. 14.
Figure 21:
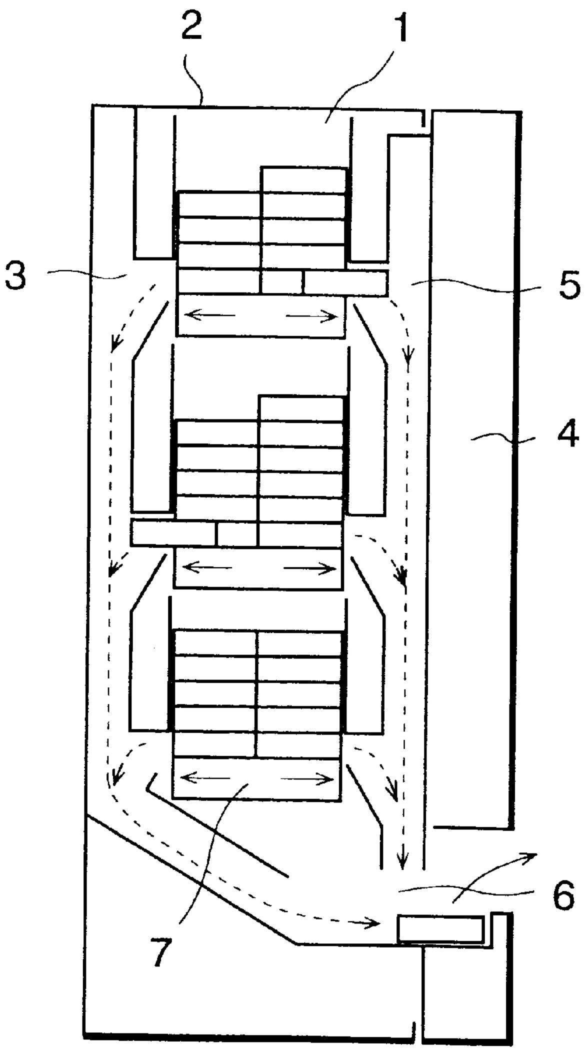
FIG. 21 (PRIOR ART)
FIG. 21 is a view showing the relation between a plurality of commodity columns and commodity chute units of a conventional vending machine.
Figure 22:
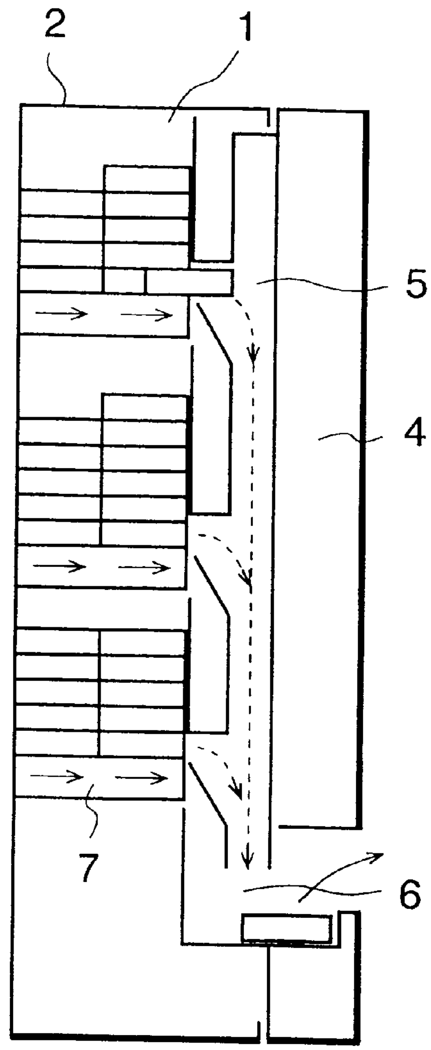
FIG. 22 (PRIOR ART)
FIG. 22 is a view showing the relation between a plurality of commodity columns and a commodity chute unit of another conventional vending machine.

The present invention is not limited to the embodiments described herein. For example, the width of each commodity guide flap 45 may be adjusted to only about ½ to ⅔ of that of each commodity column 11. As shown in FIG. 14, moreover, the commodity guide flap 45 is reduced in weight by being formed with the recess on its front side. As shown in the schematic cross-sectional view of FIG. 18, however, the guide flap 45 may alternatively be lightened by being formed having a hollow structure. As shown in FIGS. 19 and 20, moreover, the guide portion 45*e* that projects on the rear side may be formed by bending a plate material. In the case where the commodity guide flap 45 is formed of synthetic resin, furthermore, it may be provided integrally with an elastic member. It is to be understood that the present invention is not limited to the embodiments described above, and that various changes and modifications may be effected therein by one skilled in the art without departing from the scope or spirit of the invention.

What is claimed is:

1. A vending machine for packaged commodities comprising:

a body in the form of an open-front box;

a door swingably attached to the front face of the body; and a plurality of commodity storage sections arranged in stages in the body, each of said commodity storage sections including a plurality of rows of commodity columns each containing a plurality of the commodities stacked in layers, commodity dispensing mechanisms attached to the commodity columns, individually, and each adapted successively to dispense the stacked commodities in each corresponding commodity column to the front of the column, starting with the upper- or lowermost commodity, and commodity guide flaps swingably attached to the respective front faces of the commodity storage sections, individually, to cover the whole region except commodity dispensing portions for the commodity dispensing mechanisms in front of the commodity columns, and to be swung open when commodities are to be set in the commodity columns, wherein when the door is closed, the inside of the door and the commodity guide flaps define a flat space of a uniform depth extending in the vertical direction which serves as a commodity chute for guiding the selectively dispensed commodities, and when the door is opened, the commodity chute turns into an open space which allows the commodity guide flaps to be swung.

2. The vending machine according to claim 1, wherein each said commodity guide flap is formed of a transparent plate or a plate having a through hole to allow the inside of the commodity columns to be checked visually, and the respective front faces of said commodity guide flaps are situated on one plane between the commodity storage section arranged in stages, thereby forming a guide wall of the commodity chute, when the guide flaps are closed to cover the respective front faces of the corresponding commodity storage sections.

3. The vending machine according to claim 1, wherein the depth of said commodity chute defined between the front surfaces of the commodity guide flaps and the inside of the door is a little greater than maximum diagonal length of each commodity.

4. The vending machine according to claim 1, wherein each said commodity dispensing mechanism comprises a pusher for pushing a commodity and a casing of a box-like shape for supporting the pusher movably and containing a driving mechanism for driving the pusher to move forth and back, and is incorporated integrally in the upper or lower portion of each corresponding commodity column in a manner that the pusher can move in the commodity column and the front end face of the casing is flush with the commodity guide flaps and forms a part of a guide wall of the commodity chute.

5. The vending machine according to claim 1, wherein each said commodity guide flap swingably attached to the front face of each said commodity storage section is so arranged that when the door is sought to be closed with the commodity guide flap being retained in an open position for keeping the front of the commodity column open, the commodity guide flap is released from the retention in the open position in a manner linked with the closing movement of the door and automatically returns to a close position for covering the front of the commodity column.

6. A vending machine for packaged commodities comprising:

a body section;

a door section swingably attached to the front face of the body; and a plurality of commodity storage sections arranged in stages in the body section and in the door section and opposed to one another, each of said commodity storage sections including a plurality of rows of commodity columns each containing a plurality of the commodities stacked in layers, commodity dispensing mechanisms attached to the commodity columns, individually, and each adapted successively to dispense the stacked commodities in each corresponding commodity column to the front of the column, starting with the upper- or lowermost commodity, and commodity guide flaps swingably attached to the respective front faces of the commodity storage sections, individually, to cover the whole region except commodity dispensing portions for the commodity dispensing mechanisms in front of the commodity columns, and to be swung open when commodities are to be set in the commodity columns, wherein when the door is closed, the commodity guide flaps on the door section side and the commodity guide flaps on the body section side define a flat space of a uniform depth extending in the vertical direction which serves as a commodity chute for guiding the selectively dispensed commodities, and when the door is opened, the commodity chute turns into an open space which allows the commodity guide flaps to be swung.

7. The vending machine according to claim 6, wherein the respective heights of said plurality of commodity storage sections arranged in stages in the body are different from those of the ones in the door.

8. The vending machine according to claim 6, wherein the depth of said commodity chute defined between the commodity guide flaps on the body side and on the door side is a little greater than maximum diagonal length of each commodity.

9. A vending machine for packaged commodities comprising:

a body in the form of an open-front box;

a door swingably attached to the front face of the body; and a plurality of commodity storage sections arranged in stages in the body, each of said commodity storage sections including a plurality of rows of commodity columns each containing a plurality of the commodities stacked in layers, commodity dispensing mechanisms attached to the commodity columns, individually, and each adapted successively to dispense the stacked commodities in each corresponding commodity column to the front of the column, starting with the upper- or lowermost commodity, and a plurality of commodity guide flaps arranged so as to be able to rock sideways to make the front of each commodity column open when commodities are to be set in the commodity columns, and elastic members for urging the commodity guide flaps to rock, thereby situating the guide flaps in front of the commodity columns, wherein when the door is closed, the inside of the door and the commodity guide flaps define a flat space of a uniform depth extending in the vertical direction which serves as a commodity chute for guiding the selectively dispensed commodities, and when the door is opened, the commodity chute turns into an open space which allows the commodity guide flaps to be swung.

10. The vending machine according to claim 9, wherein each said commodity guide flap is formed of a flap member narrower than each said commodity column and is situated in front of the commodity column in a manner such that a given gap is defined between a rocking end of the guide flap and the front end of a side wall surface of the commodity column, and the respective front faces of said commodity guide flaps are situated on one plane between the commodity columns of the commodity storage sections arranged in stages, thereby forming a guide wall of the commodity chute.

11. The vending machine according to claim 10, wherein each said commodity guide flap narrower than each said commodity column is provided, on the rear face thereof, with a guide portion for regulating the position of the front end portion of each commodity in the commodity column, the guide portion being situated in the inner part of the commodity column with respect to the rocking end of the guide flap.

12. A vending machine for packaged commodities comprising:

a body section;

a door section swingably attached to the front face of the body; and a plurality of commodity storage sections arranged in stages in the body section and in the door section and opposed to one another, each of said commodity storage sections including a plurality of rows of commodity columns each containing a plurality of the commodities stacked in layers, commodity dispensing mechanisms attached to the commodity columns, individually, and each adapted successively to dispense the stacked commodities in each corresponding commodity column to the front of the column, starting with the upper- or lowermost commodity, and a plurality of commodity guide flaps arranged so as to be able to rock sideways to make the front of each commodity column open when commodities are to be set in the commodity columns, and elastic members for urging the commodity guide flaps to rock, thereby situating the guide flaps in front of the commodity columns, wherein when the door is closed, the commodity guide flaps on the door section side and the commodity guide flaps on the body section side define a flat space of a uniform depth extending in the vertical direction which serves as a commodity chute for guiding the selectively dispensed commodities, and when the door is opened, the commodity chute turns into an open space which allows the commodity guide flaps to be swung.

* * * * *